(12) United States Patent
VanSweden et al.

(10) Patent No.: US 9,233,526 B2
(45) Date of Patent: Jan. 12, 2016

(54) COMPOSITES HAVING IMPROVED INTERLAYER ADHESION AND METHODS THEREOF

(71) Applicant: PRODUCTIVE RESEARCH LLC, Farmington Hills, MI (US)

(72) Inventors: Chadwick Lee VanSweden, Grand Rapids, MI (US); Shimon Mizrahi, Haifa (IL)

(73) Assignee: PRODUCTIVE RESEARCH LLC, Farmington Hills, MI (US)

(*) Notice: Subject to any disclaimer, the term of this patent is extended or adjusted under 35 U.S.C. 154(b) by 0 days.

(21) Appl. No.: 13/795,856

(22) Filed: Mar. 12, 2013

(65) Prior Publication Data

US 2014/0034233 A1 Feb. 6, 2014

Related U.S. Application Data

(60) Provisional application No. 61/679,229, filed on Aug. 3, 2012.

(51) Int. Cl.
*B32B 38/16* (2006.01)
*B32B 15/08* (2006.01)
*B32B 37/06* (2006.01)

(52) U.S. Cl.
CPC ............... *B32B 38/162* (2013.01); *B32B 15/08* (2013.01); *B32B 37/06* (2013.01); *B32B 2305/30* (2013.01); *B32B 2311/24* (2013.01); *B32B 2323/00* (2013.01); *Y10T 156/10* (2015.01)

(58) Field of Classification Search
CPC .................................................... B32B 38/162
USPC ................................................... 156/281, 60
See application file for complete search history.

(56) References Cited

U.S. PATENT DOCUMENTS

| 213,015 A | 3/1879 | Wahl et al. |
| 777,656 A | 12/1904 | Banning |

(Continued)

FOREIGN PATENT DOCUMENTS

| CA | 2700549 A1 | 4/2009 |
| CH | 284305 | 7/1952 |

(Continued)

OTHER PUBLICATIONS

"The Effect of Electrical Resistance on Nugget Formation During Spot Welding", J.G. Kaiser, G.J. Dunn, and T.W. Eager, Welding Research Supplement, Jun. 1982, pp. 167-s to 174-s.

(Continued)

*Primary Examiner* — Daniel Lee
(74) *Attorney, Agent, or Firm* — The Dobrusin Law Firm, P.C.

(57) ABSTRACT

The invention relates to multi-layered composite materials and methods for making multi-layered composite materials having good adhesion between the layers. The adhesion between a polymer layer and a metal layer of a multi-layered composite material may be improved by a process including a step of pre-treating a surface of the metal layer prior to contacting the metal surface with the polymer layer, and by including filler particles in the polymer layer. Using this approach, it is possible to increase the peel strength by about 10% or more, by about 20% or more, by about 40% or more, or by about 100% or more, compared with an otherwise identical composite material that does not include both of these features.

21 Claims, 8 Drawing Sheets

(56) References Cited

U.S. PATENT DOCUMENTS

| | | | |
|---|---|---|---|
| 1,972,835 A | 9/1934 | Tainton |
| 2,286,980 A | 6/1942 | Schanz |
| 3,035,953 A | 5/1962 | Arnold |
| 3,086,899 A | 4/1963 | Smith et al. |
| 3,112,213 A | 11/1963 | Lusa |
| 3,205,337 A | 9/1965 | Hiemenz |
| 3,470,056 A | 9/1969 | Hook |
| 3,527,667 A | 9/1970 | Larsen et al. |
| 3,635,938 A | 1/1972 | Ryan |
| 3,764,277 A | 10/1973 | Hollis |
| 3,784,509 A | 1/1974 | Dotson et al. |
| 3,832,433 A | 8/1974 | Schaffer et al. |
| 3,868,388 A | 2/1975 | Dotson, Jr. et al. |
| 3,900,651 A | 8/1975 | Hoppe et al. |
| 3,903,109 A | 9/1975 | Dotson, Jr. et al. |
| 3,915,930 A | 10/1975 | Dotson, Jr. et al. |
| 3,969,868 A | 7/1976 | Bainter et al. |
| 4,037,073 A | 7/1977 | Becker |
| 4,048,355 A | 9/1977 | Sakayori et al. |
| 4,110,117 A | 8/1978 | McLeod |
| 4,110,505 A | 8/1978 | Prewo |
| 4,171,394 A | 10/1979 | Patil et al. |
| 4,229,504 A | 10/1980 | Brachman |
| 4,255,482 A | 3/1981 | Udagawa |
| 4,267,679 A | 5/1981 | Thompson |
| 4,313,996 A | 2/1982 | Newman et al. |
| 4,329,561 A | 5/1982 | Schafer et al. |
| 4,330,587 A | 5/1982 | Woodbrey |
| 4,353,951 A | 10/1982 | Yukitoshi et al. |
| 4,369,222 A | 1/1983 | Hedrick et al. |
| 4,383,942 A | 5/1983 | Davenport |
| 4,421,892 A | 12/1983 | Kasahara et al. |
| 4,424,254 A | 1/1984 | Hedrick et al. |
| 4,429,076 A | 1/1984 | Saito et al. |
| 4,461,665 A | 7/1984 | Schertler |
| 4,474,685 A | 10/1984 | Annis |
| 4,482,600 A | 11/1984 | Matsumoto et al. |
| 4,513,033 A | 4/1985 | Patil et al. |
| 4,522,875 A | 6/1985 | Still, Jr. et al. |
| 4,601,941 A | 7/1986 | Lutz et al. |
| 4,617,231 A | 10/1986 | Hamada et al. |
| 4,650,723 A | 3/1987 | Furuya |
| 4,650,951 A | 3/1987 | Koga et al. |
| 4,668,545 A | 5/1987 | Lowe |
| 4,678,699 A | 7/1987 | Gregor et al. |
| 4,678,707 A | 7/1987 | Shinozaki et al. |
| 4,690,856 A | 9/1987 | Ito et al. |
| 4,749,623 A | 6/1988 | Endo et al. |
| 4,753,850 A | 6/1988 | Ibe et al. |
| 4,758,627 A | 7/1988 | Wilkus et al. |
| 4,759,972 A | 7/1988 | Yoshiga et al. |
| 4,759,994 A | 7/1988 | Lesourd |
| 4,788,099 A | 11/1988 | Fukushima et al. |
| 4,792,499 A | 12/1988 | Shindou et al. |
| 4,794,050 A | 12/1988 | Campbell et al. |
| 4,857,377 A | 8/1989 | Daimon et al. |
| 4,873,149 A | 10/1989 | Shinoda et al. |
| 4,888,247 A | 12/1989 | Zweben et al. |
| 4,937,125 A | 6/1990 | Lepoetre et al. |
| 4,942,193 A | 7/1990 | Van Buskirk et al. |
| 4,978,582 A | 12/1990 | Stamm et al. |
| 5,030,488 A | 7/1991 | Sobolev |
| 5,030,816 A | 7/1991 | Strecker |
| 5,047,479 A | 9/1991 | Ohmae et al. |
| 5,061,778 A | 10/1991 | Uchida et al. |
| 5,063,098 A | 11/1991 | Niwa et al. |
| 5,084,357 A | 1/1992 | Imai et al. |
| 5,093,204 A | 3/1992 | Watanabe et al. |
| 5,100,737 A | 3/1992 | Colombier et al. |
| 5,216,075 A | 6/1993 | Papazoglou |
| 5,219,629 A | 6/1993 | Sobolev |
| 5,227,216 A | 7/1993 | Pettit |
| 5,278,231 A | 1/1994 | Chundury |
| 5,347,099 A | 9/1994 | Gissinger et al. |
| 5,410,133 A | 4/1995 | Matsen et al. |
| 5,418,073 A | 5/1995 | Loth et al. |
| 5,489,180 A | 2/1996 | Ichihara et al. |
| 5,518,836 A | 5/1996 | McCullough |
| 5,548,027 A | 8/1996 | Heucher et al. |
| 5,578,384 A | 11/1996 | Kingston |
| 5,604,033 A | 2/1997 | Arthurs et al. |
| 5,679,441 A | 10/1997 | Saelens et al. |
| 5,691,037 A | 11/1997 | McCutcheon et al. |
| 5,753,885 A | 5/1998 | Iwasa et al. |
| 5,778,813 A | 7/1998 | Kennedy |
| 5,846,461 A | 12/1998 | Collins et al. |
| 5,866,215 A | 2/1999 | Karbhari |
| 5,866,868 A | 2/1999 | Hirane |
| 5,894,045 A | 4/1999 | Desrondiers |
| 5,916,469 A | 6/1999 | Scoles et al. |
| 5,939,213 A | 8/1999 | Bowden et al. |
| 5,939,512 A | 8/1999 | Gervasi et al. |
| 5,951,800 A | 9/1999 | Pettit |
| 6,004,650 A | 12/1999 | Schweizer |
| 6,012,493 A | 1/2000 | Remke et al. |
| 6,050,208 A | 4/2000 | Kennedy |
| 6,090,465 A | 7/2000 | Steele et al. |
| 6,099,055 A | 8/2000 | Hirota et al. |
| 6,126,865 A | 10/2000 | Haak et al. |
| 6,138,435 A | 10/2000 | Kocher et al. |
| 6,146,488 A | 11/2000 | Okada et al. |
| 6,177,173 B1 | 1/2001 | Nelson |
| 6,202,462 B1 | 3/2001 | Hansen et al. |
| 6,268,408 B1 | 7/2001 | Dispenza |
| 6,294,257 B1 | 9/2001 | Tsukakoshi et al. |
| 6,312,812 B1* | 11/2001 | Hauser et al. ............... 428/412 |
| 6,346,292 B1 | 2/2002 | Grubb et al. |
| 6,346,491 B1 | 2/2002 | DeAngelis et al. |
| 6,387,535 B1 | 5/2002 | Mantel |
| 6,428,905 B1 | 8/2002 | Behr et al. |
| 6,455,148 B1 | 9/2002 | Spears et al. |
| 6,465,110 B1 | 10/2002 | Boss et al. |
| 6,534,194 B2 | 3/2003 | Weihs et al. |
| 6,592,968 B1 | 7/2003 | Schmit et al. |
| 6,592,979 B1 | 7/2003 | Deteresa |
| 6,659,518 B2 | 12/2003 | Ponsonnaille et al. |
| 6,673,468 B1 | 1/2004 | Behr et al. |
| 6,741,221 B2 | 5/2004 | Aisenbrey |
| 6,764,772 B2 | 7/2004 | Clyne et al. |
| 6,841,212 B2 | 1/2005 | Bicakci-Jenkins et al. |
| 6,841,252 B2 | 1/2005 | Kroes et al. |
| 6,861,156 B2 | 3/2005 | Palm |
| 6,865,805 B2 | 3/2005 | Dispenza et al. |
| 6,870,516 B2 | 3/2005 | Aisenbrey |
| 6,957,848 B2 | 10/2005 | Walther |
| 7,062,853 B2 | 6/2006 | Reed et al. |
| 7,157,140 B1 | 1/2007 | Hoppe et al. |
| 7,261,932 B2 | 8/2007 | Kennedy |
| 7,316,838 B2 | 1/2008 | Aisenbrey |
| 7,390,564 B2 | 6/2008 | Yuasa et al. |
| 7,459,115 B2 | 12/2008 | Stadler et al. |
| 7,543,384 B2 | 6/2009 | Ni et al. |
| 7,553,553 B2 | 6/2009 | Palumbo |
| 7,569,624 B2 | 8/2009 | Kolbe et al. |
| 7,592,388 B2 | 9/2009 | Wick et al. |
| 7,648,058 B2 | 1/2010 | Straza |
| 7,748,184 B1 | 7/2010 | Wheeler et al. |
| 7,833,630 B2 | 11/2010 | Sigler |
| 7,879,454 B2 | 2/2011 | Manicke |
| 7,927,708 B2 | 4/2011 | Mizrahi |
| 7,959,058 B1 | 6/2011 | Crane |
| 7,981,501 B2 | 7/2011 | Kwag et al. |
| 8,034,428 B2 | 10/2011 | Verhaeghe |
| 8,048,526 B2 | 11/2011 | Mizrahi |
| 8,071,205 B2 | 12/2011 | Tsuchiya |
| 8,153,257 B2 | 4/2012 | Mizrahi et al. |
| 8,186,566 B2 | 5/2012 | Abramovici et al. |
| 8,216,658 B2 | 7/2012 | Rajabali |
| 8,308,225 B2 | 11/2012 | Owen et al. |
| 8,309,004 B2 | 11/2012 | Pinard |
| 8,328,971 B2 | 12/2012 | Kia et al. |
| 8,344,070 B2 | 1/2013 | Squire et al. |
| 8,397,976 B2 | 3/2013 | Abramovici et al. |
| 8,404,352 B2 | 3/2013 | Schwab et al. |

(56) References Cited

U.S. PATENT DOCUMENTS

| | | |
|---|---|---|
| 8,475,930 B2 | 7/2013 | Shoji et al. |
| 8,518,521 B2 | 8/2013 | Aso et al. |
| 8,540,842 B2 | 9/2013 | Mizrahi |
| 8,573,357 B1 | 11/2013 | Hibbs |
| 8,609,247 B2 | 12/2013 | Mizrahi |
| 8,852,733 B2 | 10/2014 | Kwag et al. |
| 8,888,169 B2 | 11/2014 | Howe et al. |
| 8,889,263 B2 | 11/2014 | Rice |
| 2002/0108678 A1 | 8/2002 | Montano et al. |
| 2002/0160180 A1 | 10/2002 | Yamato et al. |
| 2003/0064241 A1 | 4/2003 | Suzuki et al. |
| 2003/0082335 A1 | 5/2003 | Clyne et al. |
| 2003/0099857 A1 | 5/2003 | Nomura et al. |
| 2003/0162049 A1 | 8/2003 | Muijnck et al. |
| 2004/0116602 A1 | 6/2004 | Botros |
| 2004/0222863 A1 | 11/2004 | Aisenbrey |
| 2004/0227688 A1 | 11/2004 | Aisenbrey |
| 2004/0233112 A1 | 11/2004 | Aisenbrey |
| 2004/0239578 A1 | 12/2004 | Aisenbrey |
| 2004/0244789 A1 | 12/2004 | Jentgens |
| 2004/0247927 A1 | 12/2004 | Kurz |
| 2005/0000947 A1 | 1/2005 | Sigler et al. |
| 2005/0001780 A1 | 1/2005 | Aisenbrey |
| 2005/0133575 A1 | 6/2005 | Gayden et al. |
| 2005/0140042 A1 | 6/2005 | Aisenbrey |
| 2005/0166956 A1 | 8/2005 | Aisenbrey |
| 2005/0181203 A1 | 8/2005 | Rawlings et al. |
| 2005/0204544 A1 | 9/2005 | Aisenbrey |
| 2005/0205712 A1 | 9/2005 | Aisenbrey |
| 2005/0206270 A1 | 9/2005 | Aisenbrey |
| 2005/0206289 A1 | 9/2005 | Aisenbrey |
| 2005/0206491 A1 | 9/2005 | Aisenbrey |
| 2005/0208251 A1 | 9/2005 | Aisenbrey |
| 2005/0208862 A1 | 9/2005 | Aisenbrey |
| 2005/0212161 A1 | 9/2005 | Aisenbrey |
| 2005/0212162 A1 | 9/2005 | Aisenbrey |
| 2005/0214553 A1 | 9/2005 | Yannetti et al. |
| 2005/0224280 A1 | 10/2005 | Aisenbrey |
| 2005/0271859 A1 | 12/2005 | Tuss |
| 2006/0003667 A1 | 1/2006 | Aisenbrey |
| 2006/0010807 A1 | 1/2006 | Whitley |
| 2006/0060296 A1 | 3/2006 | Sigler et al. |
| 2006/0060690 A1 | 3/2006 | Aisenbrey |
| 2006/0062977 A1 | 3/2006 | Sigler et al. |
| 2006/0071862 A1 | 4/2006 | Aisenbrey |
| 2006/0091887 A1 | 5/2006 | Aisenbrey |
| 2006/0134395 A1 | 6/2006 | Sigler et al. |
| 2006/0134449 A1 | 6/2006 | Sigler et al. |
| 2006/0134450 A1 | 6/2006 | Sigler et al. |
| 2006/0222869 A1 | 10/2006 | Cai et al. |
| 2006/0269701 A1 | 11/2006 | Gauriat et al. |
| 2006/0269738 A1 | 11/2006 | Kimberly |
| 2006/0286333 A1 | 12/2006 | Wang et al. |
| 2007/0062758 A1 | 3/2007 | Jensen et al. |
| 2007/0104966 A1 | 5/2007 | Calvez et al. |
| 2007/0186614 A1 | 8/2007 | Pinard |
| 2007/0187469 A1 | 8/2007 | Chen et al. |
| 2007/0196637 A1 | 8/2007 | Good et al. |
| 2007/0295704 A1 | 12/2007 | Sigler et al. |
| 2008/0012389 A1 | 1/2008 | Mittermeier et al. |
| 2008/0032094 A1 | 2/2008 | Raghavendran |
| 2008/0036241 A1 | 2/2008 | Aisenbrey |
| 2008/0081149 A1 | 4/2008 | Fuerst et al. |
| 2008/0254310 A1 | 10/2008 | Palumbo et al. |
| 2008/0311363 A1 | 12/2008 | Haskett et al. |
| 2009/0142538 A1 | 6/2009 | Sigler et al. |
| 2009/0159034 A1 | 6/2009 | Katayama et al. |
| 2009/0226755 A1 | 9/2009 | Sigler et al. |
| 2009/0280348 A1 | 11/2009 | Patberg et al. |
| 2010/0035080 A1 | 2/2010 | Sigler et al. |
| 2010/0040902 A1* | 2/2010 | Mizrahi ............ 428/600 |
| 2010/0084380 A1 | 4/2010 | Tetzlaff et al. |
| 2010/0098929 A1 | 4/2010 | Dispenza |
| 2010/0196736 A1 | 8/2010 | Boger et al. |
| 2010/0233505 A1 | 9/2010 | Boger et al. |
| 2011/0049913 A1 | 3/2011 | Bernt et al. |
| 2011/0052910 A1 | 3/2011 | Gunnink |
| 2011/0129667 A1 | 6/2011 | Botros et al. |
| 2011/0162788 A1 | 7/2011 | Mizrahi |
| 2011/0188927 A1 | 8/2011 | Mizrahi |
| 2011/0200816 A1* | 8/2011 | Mizrahi et al. ............ 428/328 |
| 2011/0265933 A1 | 11/2011 | Kia et al. |
| 2012/0196138 A1 | 8/2012 | Botros et al. |
| 2012/0214018 A1 | 8/2012 | Mizrahi et al. |
| 2013/0136944 A1 | 5/2013 | Mizrahi et al. |
| 2013/0281576 A1 | 10/2013 | Kobayashi et al. |
| 2014/0162086 A1 | 6/2014 | Mizrahi |

FOREIGN PATENT DOCUMENTS

| | | |
|---|---|---|
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A1 | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| DE | 102012103793 A | 10/2013 |
| EP | 19835 A1 | 12/1980 |
| EP | 69401 | 1/1983 |
| EP | 32355 B1 | 5/1984 |
| EP | 208443 | 6/1986 |
| EP | 249442 A2 | 12/1987 |
| EP | 311722 A1 | 4/1989 |
| EP | 322947 B1 | 7/1989 |
| EP | 335642 A2 | 10/1989 |
| EP | 354521 A2 | 2/1990 |
| EP | 356837 B1 | 3/1990 |
| EP | 6429020 | 3/1995 |
| EP | 888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | 57-34949 S | 2/1982 |
| JP | 58-142844 A | 8/1983 |
| JP | S58-142845 A | 8/1983 |
| JP | S58-180037 A | 12/1983 |
| JP | 60-068180 A | 4/1985 |
| JP | 60-201296 A | 10/1985 |
| JP | 61010445 A | 1/1986 |
| JP | 61029262 U | 7/1986 |
| JP | 61-290044 A | 12/1986 |
| JP | 62/083142 A | 4/1987 |
| JP | 62-151332 A | 7/1987 |
| JP | S62-187022 A | 8/1987 |
| JP | 63-027248 A | 2/1988 |
| JP | S63-193831 A | 8/1988 |
| JP | 63242536 A | 10/1988 |
| JP | H01-108207 A | 4/1989 |

(56) References Cited

FOREIGN PATENT DOCUMENTS

| | | |
|---|---|---|
| JP | 1154876 A1 | 6/1989 |
| JP | 01-263043 A | 10/1989 |
| JP | 2050827 A | 2/1990 |
| JP | H02-297432 A | 7/1990 |
| JP | 02-231135 A | 9/1990 |
| JP | 297432 A | 12/1990 |
| JP | 03-193443 A | 8/1991 |
| JP | 04-077245 A | 3/1992 |
| JP | 04-094928 A | 3/1992 |
| JP | 04-127972 A | 4/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 07-068701 A | 3/1995 |
| JP | 07-276557 A | 10/1995 |
| JP | 08-224827 A | 9/1996 |
| JP | 09-087528 A | 3/1997 |
| JP | 63-158242 A | 7/1998 |
| JP | H11-123790 A | 5/1999 |
| JP | 2000-263697 A | 9/2000 |
| JP | 2001-059187 A | 3/2001 |
| JP | 2011192792 A | 7/2001 |
| JP | 2001/526601 A | 12/2001 |
| JP | 2005/516817 A | 6/2005 |
| JP | 2013-515613 A | 5/2013 |
| JP | 2013-519543 A | 5/2013 |
| NL | 8203423 A | 4/1984 |
| RU | 2149788 C1 | 5/2000 |
| WO | 95/27975 A1 | 10/1995 |
| WO | 99/29492 A1 | 6/1999 |
| WO | 99/46461 A1 | 9/1999 |
| WO | 00/13892 A1 | 3/2000 |
| WO | 03/037970 A1 | 5/2003 |
| WO | 2007/061304 A1 | 5/2007 |
| WO | 2007/062061 A2 | 5/2007 |
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010/021899 A1 | 2/2010 |
| WO | 2011/100734 A1 | 8/2011 |
| WO | 2012/019115 A1 | 2/2012 |
| WO | 2012/115872 A1 | 8/2012 |
| WO | 2012/126923 A1 | 9/2012 |
| WO | 2013/062642 A1 | 5/2013 |
| WO | 2013/156166 A1 | 10/2013 |
| WO | 2013/164173 A1 | 11/2013 |
| WO | 2013/178698 A1 | 12/2013 |
| WO | 2014/009114 A1 | 1/2014 |
| WO | 2014/022478 A1 | 2/2014 |
| WO | 2014/066569 A1 | 5/2014 |

OTHER PUBLICATIONS

Abstract for: Dunand, M., et al., "USILIGHT: A cost effective solution to lighten cars", SAE Technical Paper Series, Apr. 3-6, 2006, pp. 1-10.
Abstract for: Guttman, H., et al. "Galfan—A new Coating for Automotive Tubing", SAE Technical Paper 860274, 1986.
Abstract for: Herrschaft, D. et al., "Galfan—A New Zinc-Alloy Coated Steel for Automotive Body Use", SAE Technical Paper 830517, 1983.
Abstract for: Murase, M., et al., "Development of vibration damping steel sheets for automobile oil pans", SAE Internation Congress and Exposition, Mar. 1-5, 1993; Paper No. 930023; Kawasaki Steel Corp.
Abstract for: Shimizu, T. et al., "Application of hot-dip Zn—6%Al—3%Mg Alloy Coated Steel Sheet to Automotive Body", SAE Technical Paper No. 2005-01-1330, SAE 2005 World Congress & Exhibition, Apr. 2005.
Abstract for: Welch, T. et al., "Cost and Performance Benefits for Laminated Steel Body", SAE Technical Paper 1999-01-1784, 1999.
Co-Pending U.S. Appl. No. 12/978,974, filed Dec. 27, 2010 by Mizrahi et al. (Published as 2011/0188927, Aug. 23, 2012).
Co-Pending U.S. Appl. No. 13/027,423, filed Feb. 15, 2011 by Mizrahi et al. (published as 2011/0200816, Aug. 18, 2011).
Copending U.S. Appl. No. 13/399,459, filed Feb. 17, 2012 and published as 20120214018.
Copending U.S. Appl. No. 13/052,292 filed Mar. 21, 2011 and published as US2011,0162788 A1 on Jul. 7, 2011 by Mizrahi.
Gunnink, J.W. GLARE: An Improved Damage Tolerance Material. Proc. 19th European Conference on materials for Aerospace Applications, Dec. 6-8, 2000, pp. 17-24.
Kim et al., "Formability of AA5182/polypropylene/AA5182 Sandwhich Sheets", J. of Mat. Processing Tech., 139 (2003) 1-7.
Kim et al., "Forming and Failure Behaviour of Coated, Laminated and Sandwiched Sheet Metals: A Review", J. of Mat. Processing Tech., 63 (1997), 38-42.
Mohr et al. Development of Formable Sandwich Seets for Automotive Applications, Adv. Eng. Materials, 7 (2005) 243-246.
PCT International Search Report, PCT/US2009/053676, Productive Research LLC, mailed Dec. 23, 2009.
PCT International Search Report, PCT/US2010/0062138, Productive Research LLC, mailed Mar. 18, 2011.
PCT International Search Report, PCT/US2011/024829, Productive Research LLC, mailed May 10, 2011.
PCT International Search Report, PCT/US2011/046778, Productive Research LLC, mailed Nov. 10, 2011.
International search report for copending PCT Patent Application PCT/US2012/025619 filed on Feb. 17, 2012 and mailed on May 29, 2012.
International Search report for copending PCT Patent Application PCT/US2013/064809 filed on Oct. 14, 2013 and mailed on Feb. 20, 2014.
Copending PCT Patent Application PCT/US2012/025619 filed on Feb. 17, 2012.
Copending PCT Patent Application PCT/US2013/52865, filed Jul. 31, 2013 and published as WO 2014/022478).
Shinozaki et al. "Spot-Weldable Composite Damping Sheets" www.jfe-steel.co.jp/archives/ksc_giho/16-4/j16-288-295.pdf.
Weiss et al. "The Influence on Temperature on the Forming Behavior of Metal/Polmer Laminates in Sheet Metal Forming", Transactions of the ASME, 129 (2007) 530-537.
www.quietsteel.com/pressrelease~022003.html. MSC Engineered Materials and Solutions Group, "Quiet Steel™ Debuts on 2003 Cadillac (Feb. 20, 2003)".
Tailor Welded Blanks, I-Car Advantage Online, Dec. 6, 2004 (available at http://www.i-car.com/pdf/advantage/online/2004/120604.pdf.
Copending U.S. Appl. No. 12/540,771 filed Aug. 13, 2009, now U.S. Pat. No. 7,927,708 by Mizrahi.
Copending PCT patent application No. PCT/US2011/046778 filed on Aug. 5, 2011 and published as WO 2012/019115 A1 on Feb. 9, 2012 by Mizrahi et al.
Hjertbert et al., "Functional Group Efficiency in Adhesion between Polyethylene and Aluminum", J. of Applied Polymer Science, vol. 37, 1287-97 (1989).
Link, Todd M. "Formability and Performance of Steel-Plastic Steel Laminated Sheet Materials", SAE 2001 World Congress, Detroit, MI, Mar. 5-8, 2001.
Miller, William K. "Metal-Plastic Laminates for Vehicle Weight Reduction," SAE Congress and Exposition, Detroit, MI, Feb. 25-29, 1980.
McKenna, L.W. et al., "New Light-Weight Materials for Vehicle Body Panels—Aluminum/Nylon Laminates," SAE Congress and Exposition, Detroit, MI, Feb. 25-29, 1980.
DiCello, J.A., "Steel-Polypropylene-Steel Laminate—A New Weight Reduction Material," SAE Congress and Exposition, Detroit, MI, Feb. 25-29, 1980.

(56) References Cited

OTHER PUBLICATIONS

Haward, R.N., "Strain Hardening of Thermoplastics," Macromolecules 1993, 26, 5860-5869.

Markaki, A.E. and T.W. Clyne, "Mechanics of Thin Ultra-Light Stainless Steel Sandwich Sheet Material, Part I. Stiffness," Acta Materialia 51 (2003) 1341-1350.

Markaki, A.E. and T.W. Clyne, "Mechanics of Thin Ultra-Light Stainless Steel Sandwich Sheet Material, Part II. Resistance to Delamination," Acta Materialia 51 (2003) 1351-1357.

Markaki, A.E., S.A. Westgate, and T.W. Clyne, "The Stiffness and Weldability of an Ultra-Light Steel Sandwich shhet Maerial with a Fibrous Metal Core," In Processing and Properties of Lightweight Cellular Metals and Structures, TMS, 2002, pp. 15-24.

Mohr, Dirk, "On the Role of Shear Strength in Sandwich Sheet Forming," International Journal of Solids and Structures 42 (2005) 1491-1512.

Sokolova, O. et al, "Metal-polymer-metal sandwiches with local metal reinforcements: A study on formability by deep drawing and bending," Composite Structures, 94 (2011) 1-7.

Shelly, Tom, "Steel Makes Lightweight Fibre Sandwich," Sep. 2001. Downloaded from http://fplreflib.findlay.co.uk/articles/1311/n-sandwich.htm on Jun. 3, 2013.

Weber, Mark and Musa R. Kamal, Polymer Composites, "Estimation of the Volume Resistivity of Electrically Conductive Composites"; Dated Dec. 1997, pp. 711-725.

Weiss, M. et al., "Elastic Bending of Steel-Polymer-Steel Laminates (SPS) to a Constant Curvature," Journal of Applied Mechanics (ASME), 2006. 79 (4): p. 574-579.

Copending U.S. Appl. No. 13/814,352, filed Feb. 5, 2013 by Mizrahi and published as US20130136944).

Copending U.S. Appl. No. 13/939,666, filed Jul. 11, 2013 by Mizrahi, published as US20140162086.

Copending U.S. Appl. No. 14/796,310, filed Jul. 10, 2015.

* cited by examiner

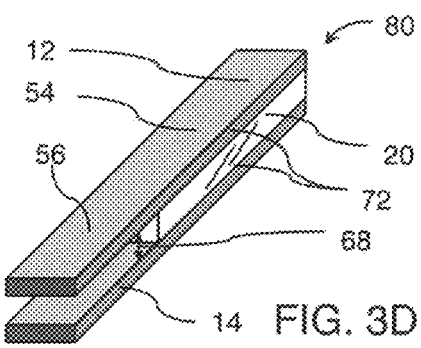
FIG. 3D
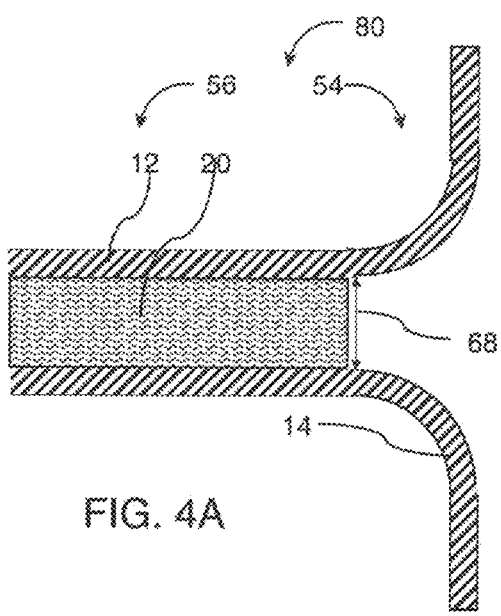
FIG. 4A
FIG. 5A
FIG. 5B
FIG. 5C
FIG. 5D
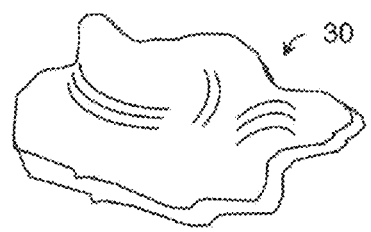
FIG. 5E
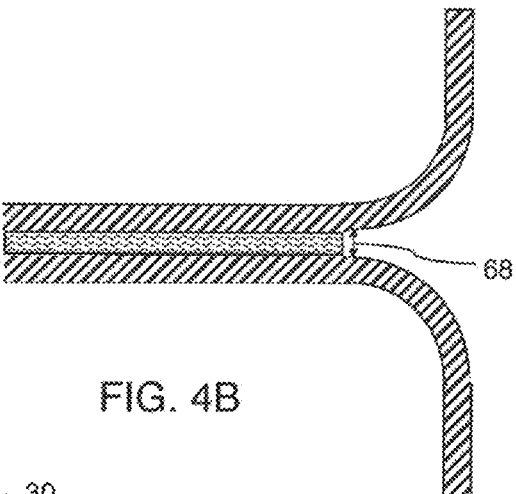
FIG. 4B
FIG. 5F

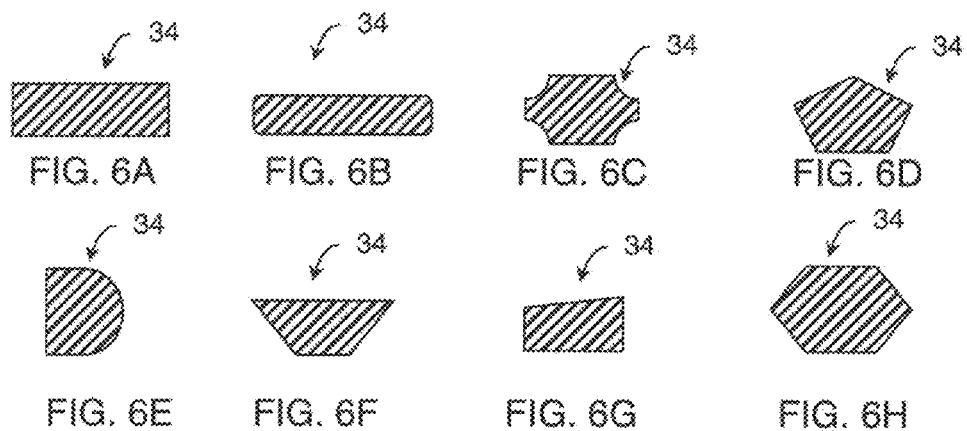
FIG. 6A  FIG. 6B  FIG. 6C  FIG. 6D
FIG. 6E  FIG. 6F  FIG. 6G  FIG. 6H
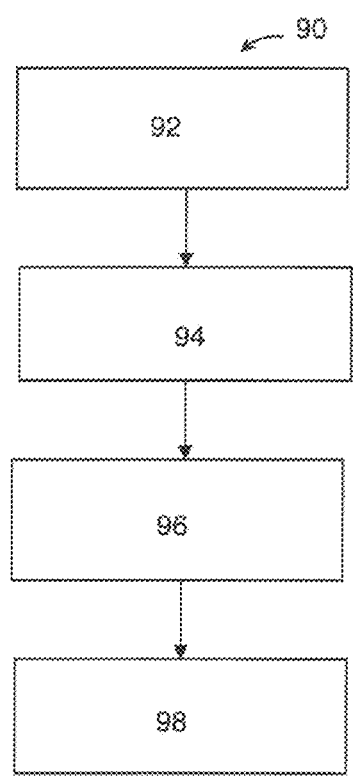
FIG. 7
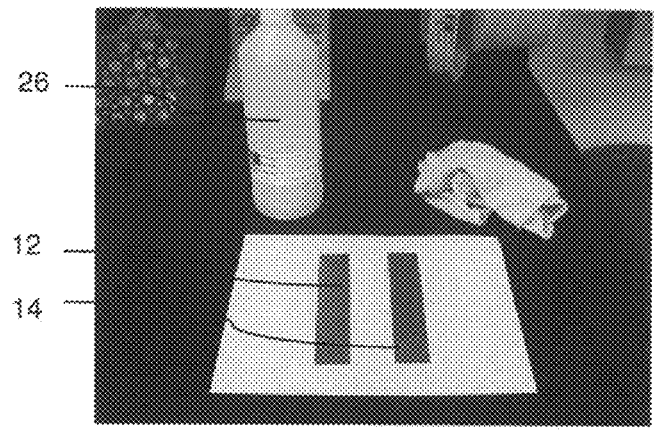
FIG. 8
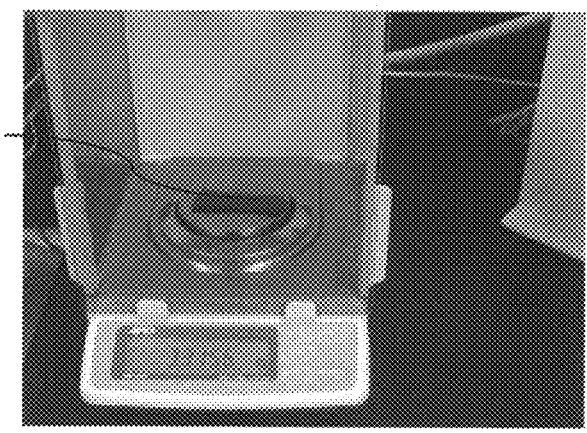
FIG. 9A

|  | Basic Shape | Length (mm) | Width (mm) | Thickness (μm) | Bulk Density g/cm3 | Repose Angle (degrees) |
|---|---|---|---|---|---|---|
| Flake A | Rectangular Flakes | 0.6 | 1.0 | 25 | 0.32 | 44 |
| Flake B | Square Flakes | 1.0 | 1.0 | 25 | 0.32 | 44 |
| Flake C | Mixed | -60 Mesh | | | 1.07 | N/A |
| Flake D | Elongated | 2.0 | 0.5 | 25 | 0.19 | 52 |
| Flake E | Square Flakes | 0.6 | 0.6 | 25 | 0.47 | 43 |

FIG. 12

COMPOSITES HAVING IMPROVED INTERLAYER ADHESION AND METHODS THEREOF

FIELD OF THE INVENTION

The invention relates to multi-layered composite materials and methods for making multi-layered composite materials having good adhesion between the layers. The composite materials generally include metal layers and a polymeric core layer interposed between the metal layers. The adhesion between the layers may be improved by treating a surface of the metal layer, dispersing a filler (e.g., a filler having a high aspect ratio, such as a flake or fiber) into the polymeric core layer, or both.

BACKGROUND OF THE INVENTION

The adhesion between polyolefins and aluminum has long be recognized as being poor due to the generally hydrophobic characteristic of polyolefins. For example, the adhesion between polyethylene and aluminum is generally low and for nearly all applications, an improvement in the adhesion of the polyolefin and aluminum is required. Various approaches have been employed to improve the adhesion between aluminum and polyolefins. These include treating the surface of either the polymer or the aluminum, using an adhesive coating or primer, and adding functional groups to the polymer. Examples of these approaches are described in U.S. Pat. Nos. 3,035,953, 3,470,056, and 3,635,938, and in U.S. Patent Application Publication No. US 2011/0129887 A1, and in Hjertberg et al., "Functional Group Efficiency in Adhesion between Polyethylene and Aluminum", J. of Applied Polymer Science, Vol. 37, 1287-97 (1989), the contents of which are all incorporated herein by reference.

These approaches require the use of special polymers, additional layers of material between the polymer and the aluminum, or special treatments steps, which can be costly, affect the performance of the composite, alter the physical properties of the material. Furthermore, some of these approaches only provide marginal improvements in adhesion.

There continues to be a need for new composite materials and new methods for producing the composite materials having good adhesion between an aluminum layer and a polyolefin layer. For example there is a need for such materials that does not rely on the use of a functionalized polymer, does not rely on the use of polymeric coating, or both.

SUMMARY OF THE INVENTION

The adhesion between a polymer layer and a metal layer of a multi-layered composite material may be improved by a process including a step of pre-treating a surface of the metal layer prior to contacting the metal surface with the polymer layer, and by including filler particles in the polymer layer. Using this approach, it is possible to increase the peel strength by about 10% or more, by about 20% or more, by about 40% or more, or by about 100% or more, compared with an otherwise identical composite material that does not include both of these features.

One aspect of the invention is directed at a process for preparing a composite material comprising the steps of: contacting a surface of a metal foil with a metal phosphate for cleaning the surface, for coating the surface, or both; contacting the surface of the metal foil with a filled polymeric core material: and adhering the filled polymeric core material to the surface of the metal foil using heat, pressure, or both; wherein the filled polymeric core material includes about 2 volume percent to about 50 volume percent metal particles; and about 50 volume percent to about 98 volume percent of one or more polyolefin resins, wherein the polyolefin resin includes about 65 weight percent of an α-olefin.

Another aspect of the invention is directed at a process for preparing a composite material comprising the steps of: contacting a surface of a metal foil with a solution including a fluoride, for sealing the surface, rinsing the surface, or both; contacting the surface with a filled polymeric core material; and adhering the filled polymeric core material to the surface of the metal foil using heat, pressure, or both; wherein the filled polymeric core material includes about 2 volume percent to about 50 volume percent metal fibers; and about 50 volume percent to about 98 volume percent of one or more polyolefin resins, wherein the polyolefin resin includes about 65 weight percent of an α-olefin.

Another aspect of the invention is directed at a composite material prepared using a method according to the teachings herein.

Yet another aspect of the invention is directed at a process for preparing a composite material comprising: (i) one or more steps of pretreating an aluminum foil selected from the group consisting of (a) washing the surface of the aluminum foil with an alkaline solution; (b) washing the surface of the aluminum foil with an acid solution; (c) contacting a surface of the aluminum foil with a metal salt; and (d) contacting a surface of the aluminum foil with a solution including a fluoride; (ii) contacting the surface with a filled polymeric core material; and (iii) adhering the filled polymeric core material to the surface of the aluminum foil using heat, pressure, or both; wherein the filled polymeric core material includes about 2 volume percent to about 50 volume percent metal fibers; and about 50 volume percent to about 98 volume percent of one or more polyolefin resins, wherein the polyolefin resin includes about 65 weight percent of an α-olefin.

BRIEF DESCRIPTION OF THE DRAWINGS

FIG. 3D is an illustrative drawing showing features of a test specimen for measuring the peel strength of the core layer on a metal layer.

FIG. 4A is a side view of an illustrative peel test specimen during testing using a T-peel test.

FIG. 4B is a side view of an illustrative peel test specimen during testing using a T-peel test.

FIGS. 5A, 5B, 5C, 5D, 5E and 5F are drawing illustrating features of flakes that may be employed according to the teachings herein.

FIGS. 6A, 6B, 6C, 6D, 6E, 6F, 6G and 6H are cross-sectional view illustrating features that may be employed in fibers according to the teachings herein.

FIG. 7 is an illustrative flow diagram showing steps that may be used in a process according to the teachings herein.

FIG. 8 is a photograph of a process including a step of wiping a metal surface with an alcohol.

FIGS. 9A, 9B, 9C, 9D, 9E, 9F, 9G, 9H, 9I, 9J, 9K, and 9L are illustrative photographs showing features of steps of preparing and testing specimens for peel testing.

FIG. 12 is a table showing illustrative features of aluminum flakes.

DETAILED DESCRIPTION

This application claims priority to U.S. Provisional Patent Application 61/679,229 entitled Composites Having Improved Interlayer Adhesion and Methods Thereof, filed on Aug. 3, 2012 by Chadwick Lee Van Sweden, which is incorporated herein by reference in its entirety.

The composite materials according to the teachings herein include a polymeric layer, such as a polymeric core layer, having a surface that faces a metal layer. The composite material may be a laminate, such as a laminate having a single metal layer, or the composite material may be a sandwich material including a polymeric core layer interposed between two metal layers. Although the composite may include additional layers, preferred composite materials consist essentially of, or consist entirely of the metal layer(s) and a single polymeric layer. For example, the composite material have two layers including a single metal skin layer or the composite material may have three layers including two metal skin layers with the polymeric core layer sandwiched between the skin layers. Such a composite material may be used in applications, such as transportation applications, where weight reduction from a polymeric core layer is desirable. These composite materials according to the teachings herein also have good forming capabilities so that they can be stamped, similar to the stamping of a monolithic sheet of steel. Examples of sandwich composite materials that offer weight reductions relative to monolithic sheets of steel and having good forming capabilities are described in U.S. Patent Application Publications US2010/0040902 A1 (by Mizrahi, published on Feb. 18, 2010), US 2011/0188927 A1 (by Mizrahi, published on Aug. 4, 2011), US 2011/0200816 A1 (by Mizrahi et al., published on Aug. 18, 2011), and PCT Patent Application Publication WO 2012/010115 A1 (by Mizrahi et al., published on Feb. 9, 2012) each incorporated herein by reference in their entirety.

Improvements in the adhesion between a surface of a polymeric layer and a surface of a metal layer have been achieved by i) employing filler particles, such as filler particles having an aspect ratio of about 10 or more in the polymeric layer; ii) pre-treating the surface of the metal layer prior to contacting with the polymeric layer; or both. In particular, it may be beneficial to employ both i) the filler particles having an aspect ratio of about 10 or more in the polymeric layer and ii) a step of pre-treating the surface of the metal layer to achieve adhesion results superior to that obtained by employing ether i) or ii) alone.

Figure 1A:
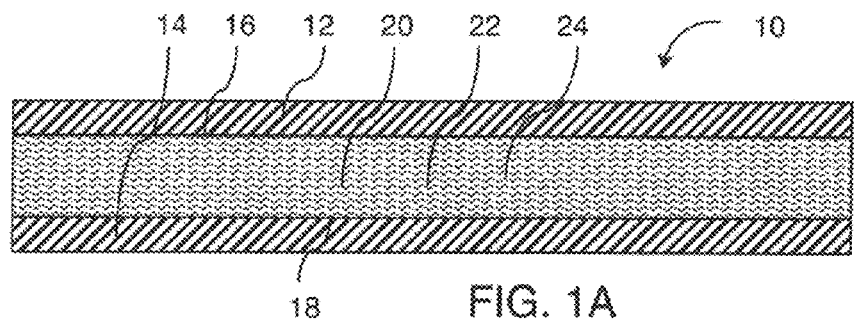
FIG. 1A is an illustrative cross-section of a composite material including a core layer that has a filler.

The composite material according to the teachings herein may include one or more features of the cross-section of the multi-layered composite material 10 illustrated in FIG. 1. The composite material 10 may include a first metal layer 12 and a second metal layer 14 with a core layer 20 interposed between the two metal layers 12, 14. The core layer 20 may include or consist essentially of a filled polymeric material. The filled polymeric material includes a polymer phase 22 having one or more polymers and a particulate filler phase 24 having one or more particulate fillers 24. The polymer phase 22 preferably is a continuous phase. The particulate filler 24 preferably is dispersed throughout the polymer phase 22. According to the teachings herein, the particulate filler preferably has a generally high aspect ratio (e.g., an aspect ratio of the length to thickness of about 10 or more). The first metal layer 12 has a face surface 16 that faces the core layer 20. The face surface 16 of the first metal layer 12 preferably has one or more surface pretreatments according to the teachings herein, so that the adhesion between the core layer and the metal layer is increased (e.g., relative to a sample prepared without a pretreatment to the metal surface). The adhesion may be determined by a T-Peel test, such as taught herein. The second metal layer 14 has a face surface 18 that faces the core layer. The face surface 16 of the first metal layer 12 preferably has one or more surface pretreatments according to the teachings herein, so that the adhesion between the core layer and the metal layer is increased. The filled polymeric material of the core layer 20 preferably contacts the facing surfaces 16, 18 of the metal layers.

Figure 1B:
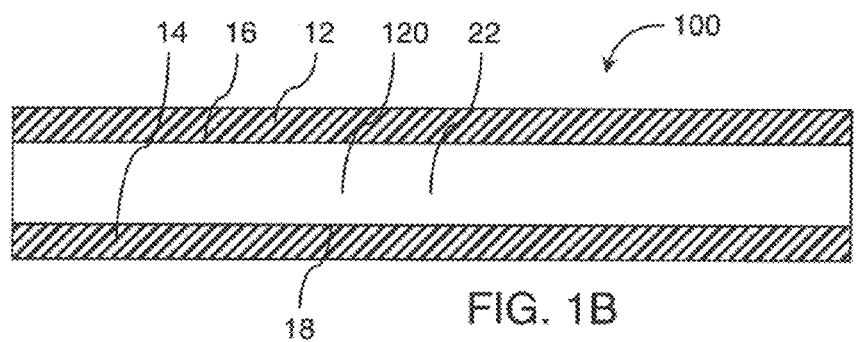
FIG. 1B is an illustrative cross-section of a composite material including a core layer that is free of filler.

FIG. 1B illustrates a cross-section of a composite material 100 that does not include the particulate filler. The composite material includes a first metal layer 12 and a second metal layer 14. The composite material has an unfilled core layer 120 that includes a polymer phase 22. The core layer does not include a particulate filler phase having particles with a high aspect ratio.

Figure 2A:
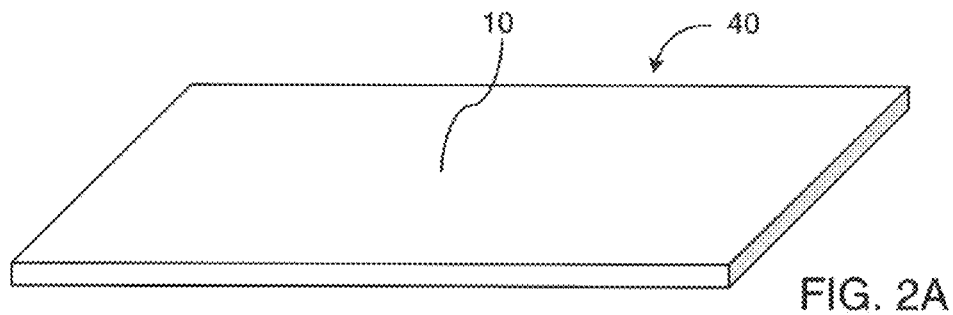
FIG. 2A is an illustrative perspective view of a sheet of a composite material, such as a generally flat sheet.
Figure 2B:
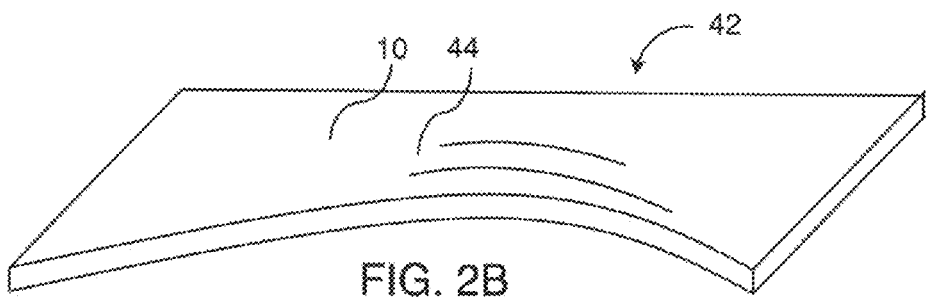
FIG. 2B is an illustrative perspective view of a sheet of composite material that has been plastically deformed, such as by stamping, so that it has one or more deformed regions.

The composite material may be provided in any shape. For example, the composite material 10 may be in the form of a sheet 40 such as illustrated in FIG. 2A. A sheet 40 of the composite material 10 may be generally flat. A sheet 40 of the composite material 40 may be wound (e.g., wound into rolls). A sheet 40 of the composite material 10 may be cut into predetermined dimensions for a forming operation. A sheet 40 may be formed into a plastically deformed formed sheet 42 (i.e., a formed sheet) having one or more deformed regions 44 that are plastically deformed, such as illustrated in FIG. 2B.

Figure 3A:
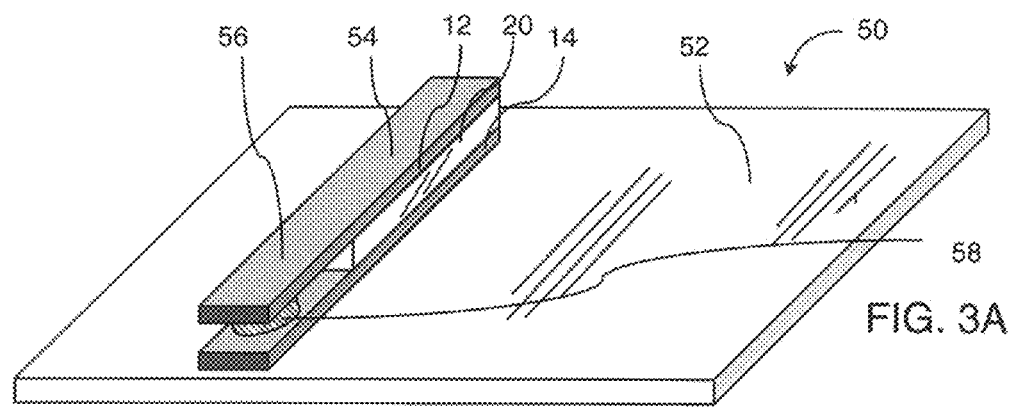
FIG. 3A is an illustrative drawing showing features of a method for preparing a test specimen for measuring the peel strength of the core layer on a metal layer.

The adhesion between the core layer and the metal layers 14 may be evaluated using a T-peel test. Features that may be employed in the preparation of the test specimens for a T-peel test are illustrated in FIGS. 3A, 3B, 3C, and 3D. A stack including two metal layers and a filled polymeric material may be assembled as illustrated in FIG. 3A. The metal layers 12, 14 may be metal coupons, such as a width, a thickness, and a length. FIG. 3A illustrates a stacking stage of preparing the T-peel specimen. The metal coupons will typically have the same dimensions. The core layer 20 is formed by placing a filled polymeric material between the two metal coupons. The core layer does not extend the entire length of the metal coupon. With reference to FIG. 3A, the test specimen will have a first region 54 with the core layer 20 disposed between the two metal layers 12, 14 and a second region 56 with no core layer 20 disposed between the two metal layers 12, 14. The second region 56 may conveniently provides a portion of the metal coupon 12, 14 for mounting in test grips for tensile testing as described hereinafter. The stack for the T-peel specimen may be positioned on a bottom platen 52. The bottom platen 52 preferably is flat and provides a metal surface for conducting heat to the specimen. Optionally, one or more shims 58 may be employed for spacing or otherwise separating the second region 56. The shim 58 may have a predetermined thickness so that the thickness for controlling the thickness of the core layer 20.

Figure 3B:
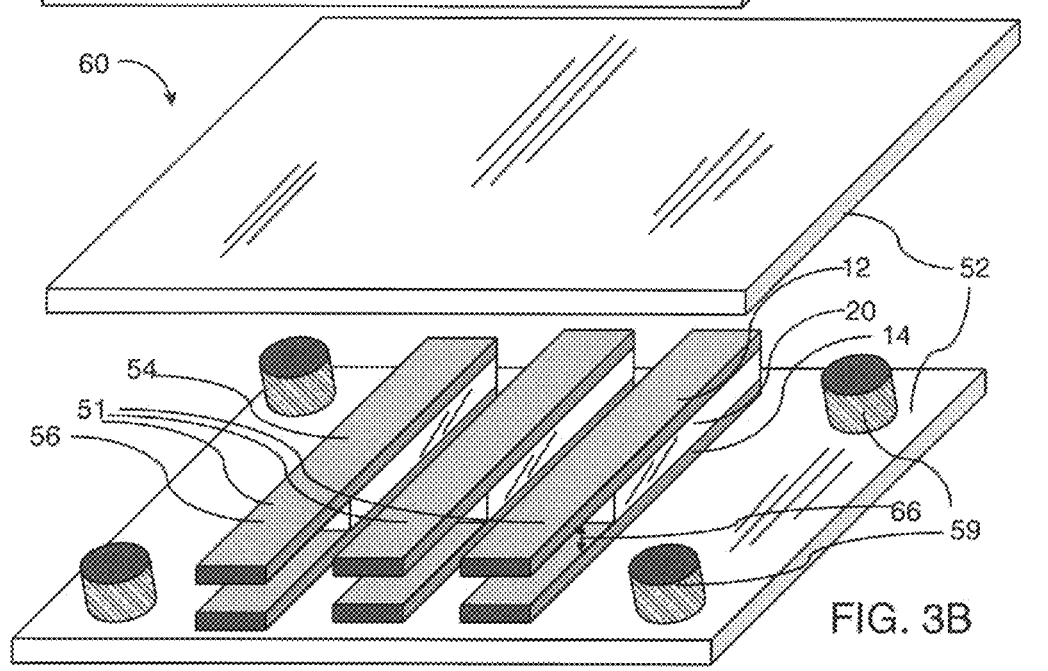
FIG. 3B is an illustrative drawing showing features of a method for preparing a test specimen for measuring the peel strength of the core layer on a metal layer.

It will be appreciated that a plurality of specimen may be prepared at that same time, such as illustrated in FIG. 3B. FIG. 3B illustrates the shimming and covering step 60 of preparing T-peel specimen. A second metal platen 52 is placed above the stacked specimen. The thickness 66 of the polymer layer determines the initial spacing between the two metal layers and thus determines the initial thickness. However, during a heating step and pressing step, the polymer melts and the metal layers are pressed together. To control the final thickness of the specimen, spacers 59 may be employed. The spacers 59 may function as a stop to control the minimum separation between the two platens 52. The spacers 59 are preferably of a material, such as a metal, that will not flow during the heating and pressing steps.

Figure 3C:
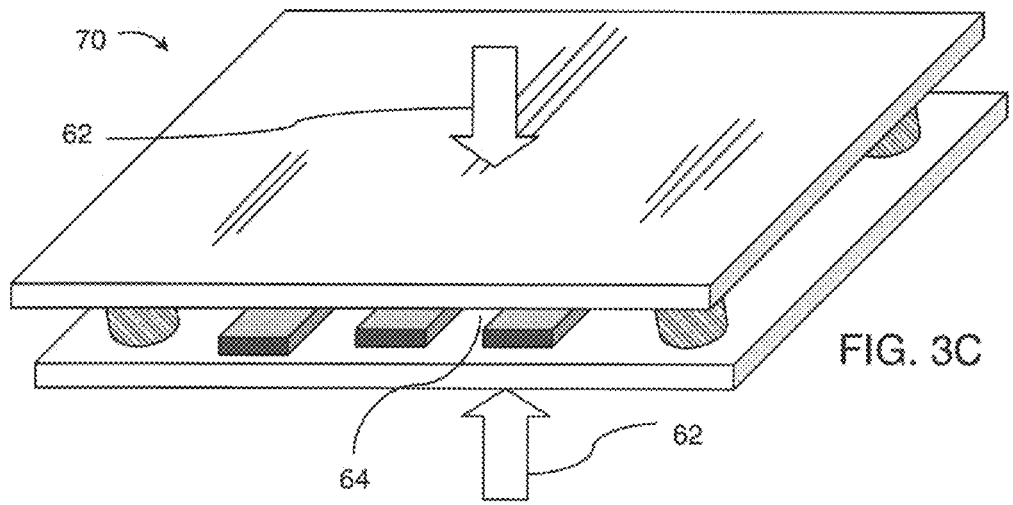
FIG. 3C is an illustrative drawing showing features of a method for preparing a test specimen for measuring the peel strength of the core layer on a metal layer.

The process for preparing the T-peel specimen generally includes heating and pressing process 70, such as illustrated in FIG. 3C. The heating and pressing process includes a step of heating the core layer polymer to an elevated temperature 64 sufficiently high so that the polymer melts. The elevated temperature may be about 460° F. A process may include a preheating time (e.g., about 5 minutes) without applying a pressure to the platens. The pressing includes a step of applying a compressive force 62 between the metal platens so that the thickness of the specimens is reduced to a predetermined thickness. The pressing time may be about 1 minute. After the pressing, the specimen is cooled. Typically excess polymer is trimmed or otherwise removed from the edges 72 of the metal layers. The final thickness of the specimen 68 is generally less than the initial thickness of the specimen 66, as illustrated in FIG. 3D showing the prepared specimen 80 before testing.

The orientation of the test specimen for the T-peel test is shown in FIGS. 4A and 4B. As illustrated in FIG. 4A, the test may be employed on materials having a generally thick core layer 20, such as a core layer that is thicker than the first metal layer 12, thicker than the second metal layer 14, or both. As illustrated in FIG. 4B, the T-peel test may be employed on materials having a generally thin core layer 20, such as a core layer that is thinner than or equal in thickness to the first metal layer 12, thinner than or equal in thickness to the second metal layer 14, or both.

The metal layers may be made of a suitable material (e.g., metal, or metal alloy) in the form of foils or sheets or other layers having equal or unequal thickness (e.g., average thickness) across the layer. Each metal layer may have a generally constant thickness or may have a thickness that varies. In the composite material including two or more metal layers, one or two metal layers may be on outside faces of the composite material (i.e., the composite material may have one or more face metals). The face metal on each side of a composite may be made of materials having the same or different properties and be made of the same or different metals. If the metal faces are made of metal layers of different thickness, metal to having different properties, or metal layers having different metals, the composite material have a marking or other means of identifying and distinguishing the different metal faces. The metal layers may be the same or different in composition, size (e.g., thickness, width, length, volume, or otherwise), shape, or other features, relative to each other layer. The metal layer and the polymeric layer preferably have substantially the same width or length, and more preferably have the same width and length.

Examples of metal layers that may be employed are described in described in international Patent Application Publication WO 2010/021899 (published on Feb. 25, 2010 by Mizrahi), see for example paragraphs 082-091, and US Patent Application Publication US 2011/0200816 A1 (published on Aug. 18, 2011 by Mizrahi et al.), see for example paragraphs 81-87, both incorporated herein by reference.

One exemplary metal layer is an aluminum foil. As used herein, an aluminum foil is a foil that includes at least 30 wt. % aluminum atoms, based on the total weight of the foil. The concentration of aluminum in the foil preferably is about 40 wt. % or more, more preferably about 50 wt. % or more, even more preferably about 70 wt. % or more, even more preferably about 80 wt. % or more, and most preferably about 90 wt. % or more, based on the total weight of the foil. The aluminum foil may be essentially pure aluminum or may be an alloy including aluminum atoms a concentration of about 99% or less, or about 95% or less, based on the total weight of the alloy.

Preferred metal layers are foils have a generally uniform thickness along the width direction. Preferred metal layers are foils have a generally uniform thickness along the length direction. A foil having generally uniform thickness may have a thickness range (i.e., difference between maximum thickness and minimum thickness), a standard deviation of thickness, or both, that is about 10% or less of the average thickness, about 5% or less of the average thickness, or about 2% or less of the average thickness.

The thickness of the metal layer should be sufficiently low so that the weight of the composite material is reduced relative to a monolithic metal material. For example, the ratio of the thickness of one metal layers to the total thickness of the composite may be about 40% or less, about 30% or less, about 20% or less, or about 15% or less. The ratio of the total thickness of all of the metal layers to the total thickness of the composite may be about 80% or less, about 60% or less, about 50% or less, about 40% or less, or about 30% or less. The total thicknesses of all of the metal layers is typically about 2 mm or less, about 1 mm or less, about 0.7 mm or less, or about 0.4 mm or less. It will be appreciated that the metal layers of the composite material according to the teachings herein may also have a total thickness greater than about 2 mm.

The thickness of the metal layer should be sufficiently high so that the layer does not tear or otherwise fail during processing or use. For example the ratio of the thickness of the metal layer to the total thickness of the composite may be about 1% or more, about 2% or more, about 3% or more, about 5% or more, about 10% or more, or about 15% or more. The total thicknesses of all of the metal layers is typically about 0.05 mm or more, about 0.10 mm or more, about 0.15 mm or more, about 0.20 mm or more, about 0.25 mm or more, about 0.30 mm or more. It will be appreciated that the metal layers of the composite material according to the teachings herein may also have a total thickness less than about 0.05 mm.

The surface of the metal layer that contacts the polymeric layer may be free of any polymeric coating (e.g., prior to contacting the metal layer and the polymeric layer). The surface of the metal layer that contacts the polymeric layer may be free of any primer or adhesive.

The composite material includes one or more polymeric layers having a density less than the density of the metal layer so that the composite material is relatively light weight compared with the metal of the metal layer. The polymeric layer (e.g., the polymeric core layer) preferably is a layer in the composite material that contacts one or two metal layers. For example the polymeric core layer may be a layer that substantially, or entirely fills the volume between two stacked and spaced apart metal layers.

The polymeric core layer preferably includes a filled polymeric material. The filled polymeric material includes, consists essentially of, or consists entirely of one or more polymers resins and one or more fillers. The concentration of the filler in the filled polymeric material may be sufficiently high so that the adhesion between the polymeric layer is increased compared to a composite material having a polymeric core layer of the same thickness and same polymer(s) with the same metal layers. The concentration of the filler in the filled polymeric material may be sufficiently high so that the composite can pass an electric current. The concentration of the filler in the filled polymeric material may be sufficiently high so that the composite material can be passed through an electro-coating process without fouling any solutions employed in the elecro-coating process with the polymer resin of the filled polymeric material.

In various aspects of the invention, it may be desirable for the filled polymeric material to be an electrically insulating layer. As such, the concentration of the filler (e.g., the metal fiber) may be sufficiently low so that the filled polymeric layer does not generally pass an electric current, across its thickness. For example, the filled polymeric layer may have an electrical resistivity of about 1,000 Ω·cm or more, about $10^4$ Ω·cm or more, about $10^5$ Ω·cm or more, about $5\times10^5$ Ω·cm or more, about $10^6$ Ω·cm or more, or about $10^7$ Ω·cm or more. For example, the concentration of the filler may be i) sufficiently high so that the adhesion between the metal layer and the polymer layer is increased and/or the composite material is capable of being electro-coated without fouling any solution in the elecro-coating process; and ii) sufficiently low so that the filled polymeric material does not pass an electric current.

The polymer resin includes one or more polymers and optionally includes one or more additives. The additives, if employed may be provided with the polymer, or may be added in one or more compounding steps. The filled polymeric material, the polymer and the additives may include one or more of the features of the polymers and additives described in International Patent Application Publication WO 2010/021899 (published on Feb. 25, 2010 by Mizrahi), see for example paragraphs 15-22, 29-51, and 85-91, and US Patent Application Publication US 2011/0200816 A1 (published on Aug. 18, 2011 by Mizrahi et al.) see for example paragraphs 27-51 and 88, both incorporated herein by reference.

The polymer resin, the filled polymeric material (e.g., the polymer of the filled polymeric material), or both, may optionally include one or more additives known to the polymer compounding art, such as described in International Patent Application Publication WO 2010/021899 (published on Feb. 25, 2010 by Mizrahi). For example, the filled polymeric material, the polymer resin, or both, may include halogenated flame retardant compounds disclosed in U.S. Pat. No. 3,784,509 (Dotson et. al., Jan. 8, 1974, see for example the substituted imides described in column 1, line 59 through column 4, line 64), U.S. Pat. No. 3,868,388 (Dotson et al. Feb. 25, 1975, see for example the halogenated bisimides described in column 1, line 23 through column 3, line 39); U.S. Pat. No. 3,903,109 (Dotson et al. Sep. 2, 1975, see for example the substituted imides described in column 1, line 46 through column 4, line 50); U.S. Pat. No. 3,915,930 (Dotson et al. Oct. 28, 1975, see for example halogenated bisimides described in column 1, line 27 through column 3, line 40); and U.S. Pat. No. 3,953,397 (Dotson et al. Apr. 27, 1976, see for example the reaction products of a brominated imide and a benzoyl chloride described in column 1, line 4 through column 2, line 28), each of which is incorporated by reference in its entirety. The polymer resin, the filled polymeric material or both, may include one or more additives to improve the drawing (e.g., stamping) of the composite material. The polymer resin, the filled polymeric material or both may include one or more additives for controlling (e.g., increasing or decreasing) the shrinkage of the filled polymeric material when the filled polymeric material is cooled from a melt state to a solid state. The polymer may be substantially free of, or entirely free of additives that reduce the adhesion between the polymer and a metallic layer (e.g., an aluminum layer).

The filled polymeric material, the polymer resin, or both, may be free of a plasticizer or other relatively low molecular weight materials which may become volatilized (e.g., during a resistance welding process). If employed, the concentration of plasticizer or other generally low molecular weight materials (e.g., having a molecular weight of about 200 or less) preferably is less than about 3 wt. %, more preferably less than about 0.5 wt. %, and most preferably less than about 0.1 wt. % based on the total weight of the filled polymeric material, based on the total weight of the polymer resin, or both.

The polymer resin preferably includes one or more polyolefin polymers. For example the polymer resin may include, consist essentially of, or consist entirely of polyolefin polymers and optionally one or more additives. The total concentration of the additives and the polyolefin polymers in the polymer resin may be about 90 wt. % or more, about 92 wt. % or more, about 94 wt. % or more, about 96 wt. % or more, about 98 wt. % or more, or about 100 wt. %, based on the total weight of the polymer resin.

As used herein, a polyolefin polymer is a polymer that consists essentially of, or consists entirely of one or more olefins. The concentration of the one or more olefins preferably is about 95 wt. % or more, more preferably about 98 wt. % or more, even more preferably about 99 wt. % or more, even more preferably about 99.5 wt. % or more, even more preferably about 99.9 wt. % or more, and most preferably about 99.96 wt. % or more, based on the total weight of the polyolefin polymer. The concentration of the one or more olefins may be about 100%, or may be about 99.99% or less, based on the total weight of the polyolefin polymer. Preferred olefins that may be employed in the polyolefin polymer include α-olefins having from 2 to 20 carbon atoms. For example, the polyolefin polymer may include, consist, essentially of, or consist entirely of ethylene, propylene, 1-butene, 1-pentene, 1-hexene, 1-heptene, and 1-octene. The polyolefin polymer may be classified based on the primary monomer the monomer that is present in the highest concentration in units of weight percent). For example, the polyolefin polymer may be a polyethylene, a polypropylene, a polybutene, or a polyhexene, where the primary monomer is respectively ethylene, propylene, butane, and hexene. The primary monomer preferably is present at a concentration of about 50 wt. %, or more, more preferably about 60 wt. % or more, even more preferably about 65 wt. % or more, even more preferably about 70 wt. % or more, and most preferably about 75 wt. % or more. Particularly preferred polyolefin polymers include polyethylene homopolymers, polyethylene copolymers, polypropylene homopolymers, and polypropylene copolymers. The total concentration of ethylene, propylene, butane, hexene and octene in the polyolefin polymer is preferably is about 95 wt. % or more, more preferably about 98 wt. % or more, even more preferably about 99 wt. % or more, even more preferably about 99.5 wt. % or more, even more preferably about 99.9 wt. % or more, and most preferably about 9996 wt. % or more, based on the total weight of the polyolefin polymer.

The polyolefin polymer may be prepared by any suitable polymerization process. Particularly preferred polyolefin polymers are polymerized using a Ziegler-Natta catalyst or a single site catalyst, such as a metallocene catalyst.

The polymer (e.g., the polyolefin polymer) may be a homopolymer or a copolymer. The polymer (e.g., the polyolefin polymer) preferably is a thermoplastic polymer having a final melting point of about 70° C. or more. The polymer (e.g., the polyolefin polymer) may be a thermoplastic polymer having a crystallinity of about 5% or more, about 10% or more, about 15% or more, about 20% or more, or about 25% or more. The polymer (e.g., the polyolefin polymer) may be a thermoplastic polymer having a crystallinity of about 75% or less, about 70% or less, or about 60% or less. Crystallinity of the polymer may be measured using differential scanning calorimetry by measuring the heat of fusion and comparing it to art known heat of fusion for the specific polymer (e.g., having the same polymer crystals).

The thermoplastic polymer may be selected so that it includes relatively long chains, such that they may have a number average molecular weight greater than about 20,000, preferably greeter than about 60,000, and most preferably greater than about 140,000.

The polymer preferably is selected so that it has a melt index sufficiently high so that the polymer can be processed using extrusion equipment. Preferred polymers have a flow rate of about 0.05 g/10 min or more, about 0.1 g/10 min or more, or about 0.3 g/10 min or more as measured according to ASTM D1238 at 190° C./2.16 kg. The polymer preferably has a melt index sufficiently low so that the polymer has good mechanical properties. Preferred polymers have a melt flow rate of about 1000 g/10 min or less, about 200 g/10 mm or less, about 50 g/10 min or less, about 20 g/10 min or less, or about 4 g/10 min or less as measured according to ASTM D1238 at 190° C./2.16 kg.

The polymer may include a polyolefin plastomer. The polyolefin plastomer may include, consist essentially of, or consist entirely of two or more α-olefins having 2 to 20 carbon atoms. For example, the polyolefin plastomer may include a first α-olefin having 2 or 3 carbon atoms, and a second α-olefin having more carbon atoms than the first α-olefin. Preferred second α-olefins include butene, hexene, and octene. Suitable α-olefins may have one or more double bonds. Preferred α-olefins have exactly one double bond. The first α-olefin and the second α-olefin preferably have exactly one double bond. The concentration of α-olefins having more than one double bond preferably is about 15 wt. % or less, more preferably about 5 wt. % or less, even more preferably about 2 wt. % or less, even more preferably about 1 wt. % or less, and most preferably about 0.3 wt. % or less, based on the total weight of the plastomer. The concentration of α-olefins having more than one double bond may be 0, or may be about 0.1 wt. % or more. The concentration of the α-olefins having one exactly one double bond (e.g., the concentration of the first α-olefin and the second α-olefin) preferably is about 85 wt. % or more, more preferably about 95 wt. % or more, more preferably about 98 wt. % or more, even more preferably about 99 wt. % or more, based on the total weight of the polyolefin plastomer. The concentration of α-olefins having exactly one double may be 100 wt. % or may be about 99.9 wt. % or less. The polyolefin plastomer may be an ethylene plastomer including about 50 wt. % or more ethylene monomer. The polyolefin plastomer may be a propylene plastomer including about 50 wt. % or more propylene monomer. Preferably the second monomer is present at a concentration of about 20 wt. %, more preferably about 30 wt. % or more. Preferred polyolefin plastomer have a melting temperature of about 50° C. or more, about 60° C. or more, or about 70° C. or more. Preferred polyolefin plastomers have a melting temperature of about 110° C. or less, about 105° C. or less, about 100° C. or less, about 95° C. or less, or about 90° C. or less. Preferred polyolefin plastomers have a crystallinity of about 1% or more, about 2% or more or about 5% or more. The crystallinity of the polyefin plastomer preferably is about 35% or less, more preferably about 25% or less, and most preferably about 20% or less. Examples of polyolefin plastomers that may be employed include EXACT, commercially available from ExxonMobil Chemical Company, and ENGAGE available from Dow Chemical Company.

The filled polymeric material includes one or more particulate fillers. The filled polymeric material preferably includes a sufficient concentration of particulate filler so that the peel strength of the filled polymeric material and the metal layer is increased. For example, the filled polymeric material may include a sufficient concentration of particulate filler so that when used as a core material between two metal layers that have been pretreated according to the teachings herein, the peel strength is about 25% or more greater than the peel strength when no filler particles are employed in the filled polymeric material. Preferred particulate fillers are fillers having a generally high aspect ratio, such as an aspect ratio of about 10 or more.

Examples of particulate fillers having a high aspect ratio include fillers having particle shapes that are fibers, or plates. Fibers have one dimension, (e.g., a length), that is substantially greater in distance than the dimensions in the other directions (e.g., directions orthogonal to the length, such as width and thickness, or diameter). The fibers may be straight or bent. If the fibers are bent, the length of the fiber is defined by the curvilinear distance in the long direction. Plates have two or more dimension (e.g., a length and a width, or a diameter) that are substantially greater in distance than a third dimension (e.g., in a direction orthogonal to the first two dimensions, such as a thickness). The plate may be flat or may have curvature. If the plat has curvature, it may have only regions with concave curvature, only regions with convex curvature, or both regions with concave curvature and regions with convex curvature. The plate like particle may have a regular shape such as a geometric. For example the plate shaped filler particles may be flakes that have curvature and an irregular shape. The aspect ratio may be defined by the ratio of the length of the particle filler (e.g., fiber, plate, or otherwise) to the thickness of the particulate filler. Particularly preferred particulate fillers are characterized as having an aspect ratio of about 10 or more, more preferably about 20 or more, even more preferably about 30 or more, more preferably about 50 or more, and most preferably about 100 or more.

The particulate filler may have a relatively high stiffness compared to the polymer of the filled polymeric material so that the stiffness of the filled polymeric material is increased. For example, the ratio of the modulus of the particulate filler to the modulus of the polymer may be about 1.3 or more, about 2 or more, about 5 or more, about 10 or more, or about 30 or more.

Preferred particulate fillers are sufficiently ductile so that they can deform without fracturing, such as during a step of forming the composite material and/or during use of the composite material. For example, preferred particulate fillers are not brittle at temperatures between −40° C. and 120° C., such that they can be strained by about 5% or more, by about 10% or more, or by about 15% or more, in a tensile mode at a rate of about 25 mm/min. If any brittle particulate filler is employed in the filled polymeric material, they preferably are present at a concentration of about 25 weight percent or less, more preferably about 10 weight percent or less, and most preferably about 4 weight percent or less, based on the total weight of the particulate fillers in the filled polymeric material. The filled polymeric material preferably is substantially (e.g., about 2 weight percent or less, or about 1 weight percent or less) or entirely free of brittle particulate fillers.

The particulate filler may be of any suitable material that results in composites with generally good adhesion between the filled polymeric material and the metal layers. For example, the particulate filler may be a metal, a polymer, or a mineral filler. The particulate filler may be organic or inorganic. The particulate filler may be made of any of the materials described hereinbefore for the metal layers. Preferred particulate fillers are metallic and may be the same or different metal as the metal layers.

Examples of particulate fillers that may be employed include the metallic fillers (e.g., metallic fibers) described in paragraphs 064-081 of International Patent Application Publication WO 2010/021899 (published on Feb. 25, 2010 by Mizrahi), and paragraphs 52-70, FIGS. 2A, 2B, 2C, 2D, 2E, 2F, 2G, 2H, 2I, 2J, 3, and 4 of U.S. Patent Application Publication 2011/0188927 (published Aug. 4, 2011 by Mizrahi), and paragraphs 66-88 of U.S. Patent Application Publication 2011/0200816 (published Aug. 18, 2011 by Mizrahi), all incorporated herein by reference.

A particularly preferred particulate filler is a fiber or plate (e.g., flake) including or consisting substantially of aluminum.

The concentration of the particulate filler may be sufficiently high so that the adhesion between the metal layer and the core layer (e.g., a layer of the filled polymeric material) is increased. For example, the concentration of the particulate filler may be about 1 volume % or more, about 2 volume % or more, about 4 volume % or more, about 6 volume % or more, about or 8 volume % or more, based on the total volume of the filled polymeric material. Preferably the concentration of the particulate filler is sufficiently low so that the density of the composite material is reduced or minimized. The concentration of the particulate filler may be about 50 volume % or less, about 40 volume % or less, about 30 volume % or less, about 22 volume % or less, about 16 volume % or less, about 10 volume % or less, or about 9 volume % or less, based on the total volume of the filled polymeric material.

The particulate filler may have a longest dimension which is characterized by the weight average length, $L_{avg}$. The weight average length may be greater than about 0.5 mm, more preferably greater than about 1 mm, and most preferably greater than about 2 mm. Suitable particles may have an $L_{avg}$ of less than about 100 mm, preferably less than about 35 mm, more preferably less than about 25 mm, and most preferably less than about 15 mm.

The particulate filler may have a smallest dimension which is characterized by the weight average thickness. The weight average thickness of the particulate filler (e.g., fiber or plates) may be greater than about 0.1 µm, more preferably greater than about 1.0 µm, and most preferably greater than about 4 µm. The weight average thickness of the particulate filler may be less than about 300 µm, preferably less than about 50 µm, even more preferably less than about 40 µm, and most preferably less than about 30 µm.

The particulate filler may have any shape. For example, the particulate filler particle may be plate-like particles 30 having two opposing faces that are generally planar, such as shown in FIGS. 5A, 5B, 5C, and 5E, or having opposing faces that are generally arcuate, such as illustrated in FIGS. 5D and 5F. The particulate filler may be fibers (e.g., metallic fibers) having a length that is generally straight (i.e., linear), that is generally arcuate, or includes portions that are generally straight and portions that are generally arcuate. The cross-section of the fiber may be generally uniform within a fiber or may vary along the length of the fiber. Preferred fibers are generally uniform along the length of an individual fiber. The fibers may have any cross-sectional shape (e.g., in the direction perpendicular to the length of the fiber. The cross-section shape of the fiber may be entirely arcuate, such as a circular, elliptical, or oval shape. The cross-section may include one or more straight sides. Examples of cross-sections 34 of fibers 32 having one or more straight sides are shown in FIGS. 6A, 6B, 6C, 6D, 6E, 6F, 6G, and 6H. The cross-section of suitable fibers having one or more straight sides may include one or any combination of the features shown in FIGS. 6A, 6B, 6C, 6D, 6E, 6F, 6G, and 6H. For example, the fibers may have a cross-section with one or more, or two or more pairs of opposing edges that are generally straight.

The particulate preferably has a high surface area to volume ratio so that small concentrations of particulate filler may be employed while maintaining generally high contact area between the filler and the polymer. The ratio of surface area to the volume of the particulate filler preferably is about 5 mm$^{-1}$ or more, more preferably about 10 mm$^{-1}$ or more, even more preferably about 15 mm$^{-1}$ or more, and most preferably about 20 mm$^{-1}$ or more.

The cross-sectional area of the fibers in the plane transverse to the longitudinal axis preferably is about $1\times10^{-6}$ mm$^2$ or more, more preferably about $1\times10^{-5}$ mm$^2$ or more, even more preferably about $8\times10^{-5}$ mm$^2$ or more, even more preferably about $1\times10^{-4}$ mm$^2$ or more, and most preferably about $4\times10^{-4}$ mm$^2$ or more. The cross-sectional area of the fibers in the plane transverse to the longitudinal axis preferably is about $2.5\times10^{-3}$ mm$^2$ or less, more preferably about $1\times10^{-3}$ mm$^2$ or less, even more preferably about $2.5\times10^{-3}$ mm$^2$ or less, and most preferably about $1\times10^{-3}$ mm$^2$ or less.

The particulate filler may have a substantially constant thickness across its length, across it width, or both. A major surface of the particulate filler may be smooth (i.e., generally free of texture), or may have a texture. For example a ribbon-like fiber may have both major surfaces that are smooth, both major surfaces that are textured, or one major surface that is textured and one major surface that is smooth.

The particulate filler preferably has a weighted average thickness of about 1 µm or more, about 5 µm or more, about 15 µm or more, or about 20 µm or more. The particulate filler preferably has a weight average thickness of about 200 µm or less, about 100 µm or less, about 80 µm or less, about 70 µm or less, or about 60 µm or less.

The particulate filler may include or consist essentially of metal fibers having one or any combination of the features described herein. The weight average length of the metal fibers preferably is about 0.4 mm or more, more preferably about 0.6 mm or more, and most preferably about 0.8 mm or more. The weight average length of the metal fiber preferably is about 20 mm or less, more preferably about 10 mm or less, even more preferably about 7 mm or less, and most preferably about 5 mm or less.

The particulate filler is preferably sufficiently thin and present in a sufficient concentration so that many fibers are arranged between the surfaces of the layer. For example, the average number of particles that intersect a line parallel to the thickness direction of the filled polymeric layer and going through the polymeric layer preferably is about 3 or more, more preferably about 5 or more, more preferably about 10 or more, and most preferably about 20 or more. Without being bound by theory, it is believed that a large number of particles advantageously improves the apparent adhesion between the filled polymeric material and the metal layers (e.g., as measured by the peel test).

The total concentration of the polymer and the filler (e.g., the particulate filler) in the filled polymeric layer preferably is about 80 volume % or more, more preferably about 95% or more, even more preferably about 98% or more (e.g., about 100%), based on the total volume of the volume of the filled polymeric material. The filled polymeric material may be substantially or even entirely free of voids. The concentration of voids, if present, preferably is about 10 volume % or less, more preferably about 2 volume % or less, and most preferably about 2 volume % or less, based on the total volume of the filled polymeric material and/or based on the total volume between the metal layers.

The volume ratio of the polymer (e.g., the thermoplastic polymer) to the particulate filler (e.g., the metallic fibers) is preferably about 2.5:1 or more, more preferably about 3:1 or more, and most preferably about 4:1 or more. The volume ratio of the polymer (e.g., the thermoplastic polymer) to the particulate filler (e.g., the metallic fibers) is preferably about 99:1 or less, more preferably about 33:1 or less, even more preferably about 19:1 or less, even more preferably about 9:1 or less, and most preferably about 7:1 or less.

The particulate filler (e.g., the metallic fiber) preferably is present at a concentration greater than about 40 volume %, more preferably greater than about 70 volume %, and most preferably greater than about 80% (e.g., greater than about 90 volume %, or even greater than about 95 volume %) based on the total volume of the filler in the filled polymeric material.

The particulate filler (e.g., the metallic fibers) preferably is dispersed (e.g., randomly dispersed) in the polymeric matrix at a volumetric concentration of less than about 30% (more preferably less than about 25%, and most preferably less than about 20%) by volume of the total polymeric layer).

The process for preparing the filled polymeric material and the composite material may employ a process including one or any combination of the steps and/or features described in International Patent Application Publication WO 2010/021899 (published on Feb. 25, 2010 by Mizrahi), see for example paragraphs 092-107; and US Patent Application Publication 2011/0200816 A1 (published on Aug. 18, 2011 by Mizrahi et al), see for examples paragraphs 102-114, both incorporated herein by reference.

The composite material may be prepared using a process that results in the filled polymeric material (e.g., core layer) being bonded to at least one adjoining layer (e.g., a metallic sheet) and preferably being interposed between two layers (e.g., two metallic layers) and bonded to one or both layers. The process may include one or any combination of steps of heating, cooling, deforming (e.g., forming, such as by stamping), or bonding, in order to arrive at a final desired article. It is envisioned that at least one, or even all of the adjoining layers (e.g., metallic layers) may be provided in the form of a rolled sheet, a forging, a casting, a formed structure, an extruded layer, a sintered layer, or any combination thereof.

Preferably, the process includes one or more steps of pretreating a surface of the metal layer to be contacted with the filled polymeric material. For example, the face of each of the two metal layers that will be in contact with the filled polymeric material may be exposed to one or more steps of pretreating the surface. It will be appreciated that one or more steps of the pretreatment may additionally be applied to surfaces that will not contact the filled polymeric material. For example, it may be advantageous to expose all of the surfaces of one or both metal layers (e.g., metal foils) to some or all of the pretreatment steps so that the metal layer has generally uniform surface treatments.

The pretreating steps may include one or any combination of the following steps: one or more steps of washing the metal surface, one or more steps of applying a cleaner and/or coater to the metal surface, one or more steps of sealing the metal surface, or one or more steps of rinsing the metal surface.

The step of washing the metal surface may include one or more steps of contacting the surface of the metal with water, contacting the surface of the metal with a water solution, contacting the surface of the metal with a solvent, or any combination thereof. Preferred water solutions include alkaline solutions and acid solutions. The alkaline solution may include a solution of a metal hydroxide in water. The concentration of the metal hydroxide preferably is sufficiently high so that the pH of the solution is about 8 or more, about 9 or more, about 10 or more, or about 11 or more. The alkaline solution may have a pH of about 14 or less, about 13 or less, or about 12 or less. Suitable acid solutions include an acid that is soluble in water. The concentration of the acid may be sufficiently high so that the pH of the solution is about 6 or less, about 5 or less, about 4 or less, or about 3 or less. The acid solution may have a sufficiently low pH so that the acid solution is capable of etching the surface of the metal. Acid solutions that do not etch the surface of the metal may also be employed. Following a step of contacting the surface of the metal with an alkaline solution or an acid solution, the metal surface may be further washed with water, with a neutralizer, or with water that includes a neutralizer.

The step of contacting the surface of the metal with a cleaner/coater may include a step of contacting a surface of the metal with a solution including a metal salt. The metal salt may include a halide, a nitrate, a nitrite, a phosphate, a phosphate, a sulfate, a sulfide, or any combination thereof. A particularly preferred metal salt is a metal phosphate. The metal phosphate may be any metal phosphate useful for cleaning the metal. Examples of the metal phosphates that may be employed alone or in any combination include zinc phosphate, manganese phosphate, or iron phosphate. A preferred metal phosphate is zinc phosphate. For example, the step of washing may include contacting the metal surface with a solution including CHEMFOS® 700 NR zinc phosphate, commercially available from PPG. The process preferably includes a plurality of steps of contacting the metal surface with a cleaner/coater. The process may include one or more steps of rinsing between two steps of contacting the metal surface with a cleaner/coater.

The step of sealing may include a step of contacting the metal surface with a solution including a halide. For example, the solution may include a bromide, a chloride, a fluoride, or any combination thereof. Preferred sealing steps include a step of contacting the metal surface with a solution including a fluoride. The solution for the sealing step preferably is free of chromium atoms (e.g., free of chrome). By way of example, the step of sealing may employ a sealer solution that includes a chromium free, fluoride sealer such as CHEMSEAL® 59 commercially available from PPG.

The process may de one or more steps of rinsing the surface of the metal layer. A rinsing step may include a titanated activated rinse, a step of rinsing a phosphate, a step or rinsing a sealant, or any combination thereof. A step of rinsing may apply water, one or me more organic solvents or any combination thereof. A preferred rinse includes or consists essentially deionized water.

The step of pretreating the surface of the metal preferably is free of a step of e-coating the surface. The step of pretreating the surface of the metal preferably is free of a step of coating the surface with a polymer prior to contacting the surface with the filled polymeric material.

One or more, or even all of the aforementioned pretreating steps may be particularly useful in a composite material that includes aluminum metal layers and a filled polymeric material including a fibers and a polymer (e.g., a polyolefin).

The sheets (e.g., after the one or more pretreating steps) may be heated to a temperature greater than about 90° C. (e.g. greater than about 130° C., or greater than about 180° C.). Preferably, the sheets are heated to a temperature greater than about $T_{min}$, where $T_{min}$ is the highest glass transition temperature ($T_g$) and melting temperature ($T_m$) of the thermoplastic of the filled polymeric material. The metallic sheets, the filled polymeric material, or both may heated to a maximum temperature above which the polymer (e.g., the thermoplastic polymer) may undergo significant degradation. The thermoplastic polymer may be heated to a temperature preferably less than about 350° C., more preferably less than about 300° C. The heated polymer may be mixed with the metallic fiber, and with any additional fillers. The heated polymer (e.g., thermoplastic polymer) may be extruded as a sheet layer. The sheet layer may be extruded directly between the metal faces, or placed between the metal faces later in the process or in a separate step. The process may include one or more steps of drying the polymer so that the concentration of water in the polymer is below a predetermined maximum moisture concentration. A step of drying the polymer may occur before, during, or after a step of heating the polymer. The process may include one or more steps of storing a polymer, a polymeric core layer, or a composite material in low humidity environment so that the concentration of water in the polymer is maintained below a predetermined maximum moisture concentration. When the filled polymeric material contacts the surface of the metal layer (e.g., the aluminum foil), the temperature of the polymer may be about ($T_m$–30° C.) or more, about ($T_m$–20° C.), about $T_m$–10° C. or more, or about $T_m$ or more, where $T_m$ is the melting temperature of the polymer.

The surface pretreatment 90 of a surface (i.e., at least surfaces 16 and/or 18) of the metal layer 12, 14 may include one or any combination of the steps illustrated in FIG. 7. The surface pretreatment process may include one or more steps of washing the metal surface 92. The surface pretreatment process may include one or more steps of contacting the metal surface (i.e., at least surfaces 16 and/or 18 of the metal layers) with a cleaner and/or coater 94. The surface pretreatment process may include one or more steps of contacting the metal surface with a sealer 96. The surface pretreatment process may include one or more steps of rinsing the metal surface 98. Preferably the surface pretreatment process includes at least one step of contacting the metal surface with a cleaner and/or coater 94, at least one step of contacting the metal surface with a sealer 96, or both. It will be appreciated that any of the steps may be eliminated and/or repeated. For example, one, two or more steps may be repeated two or more times, sequentially or between other steps. The order of the steps may be altered with the proviso that generally good adhesion between the core layer and the metal layer is maintained (e.g., good adhesion may include a T-peel force that is at least 20% improved over a material prepared without a pretreatment of the metal surface). The pretreatment of the metal surface preferably is completed prior to contacting the metal layer with the filled polymeric material.

The polymeric core layer may be a homogeneous layer or may comprise a plurality of sublayers. Preferably the polymeric core layer is a homogeneous layer (i.e., a layer of the filled polymeric material) and is free of any separate adhesive layers.

The process for fabricating the composite material may also include one or more steps of heating one or more metal layers, applying pressure to the layers, calendaring a polymer (e.g., a thermoplastic polymer or the thermoplastic polymer compounded with the metallic fiber and the optional fillers), and annealing the composite sheet (e.g., at a temperature greater than melting temperature of any thermoplastic polymer in the material).

The process for preparing the filled polymeric material (e.g., a core layer for the sandwich composites herein) may include a step of contacting the fiber and at least a portion of the polymer (e.g., thermoplastic polymer), blending the fiber and at least a portion of the polymer, or both. The process of forming the polymeric layer may be a continuous process or a batch process. Preferably, the process is a continuous process. The blending or contacting step may include heating the polymer to a maximum temperature greater than about 90° C., greater than about 140° C., greater than about 170° C., or greater than about 190° C. The blending or contacting step may include heating the polymer to a maximum temperature less than about 350° C. less than about 300° C., less than about 280° C. less than about 270° C., or less than about 250° C.

The process may employ one or more steps of applying pressure when at least some of the polymer of the filled polymeric material is at a temperature greater than about 80° C., preferably greater than about 120° C., more preferably greater than about 180° C., even more preferably greater than about 210° C., and most preferably greater than about 230° C. The step of applying pressure may employ a maximum pressure greater than about 0.01 MPa, preferably greater than about 0.1 MPa, more preferably greater than about 0.5 MPa, even more preferably greater than about 1 MPa, and most preferably greater than about 2 MPa. The maximum pressure during the step of applying pressure may be less than about 200 MPa, preferably less than about 100 MPa, more preferably less than about 40 MPa, and most preferably less than about 25 MPa. The process may also include a step of cooling the composite material (e.g., to a temperature below $T_{min}$, preferably below the melting temperature of polymer of the filled polymeric material, and more preferably below about 50° C.).

The process for preparing a metal surface may include a step of cleaning the metal surface with isopropyl alcohol 26 such as illustrated in FIG. 8. The cleaning step may be a manual process, an automated process, or both. A cleaning step may be used for one or both surfaces of a metal layer 12, 14. It will be appreciated that the preparation of the metal surface may also include one or more pretreatment steps according to the teachings herein. The pretreatment step may be used in preparing metal coupons (e.g., having a dimension of about 1.25 inches by about 6 inches) for use in a composite test specimen, as shown in FIG. 8.

Figure 9B:
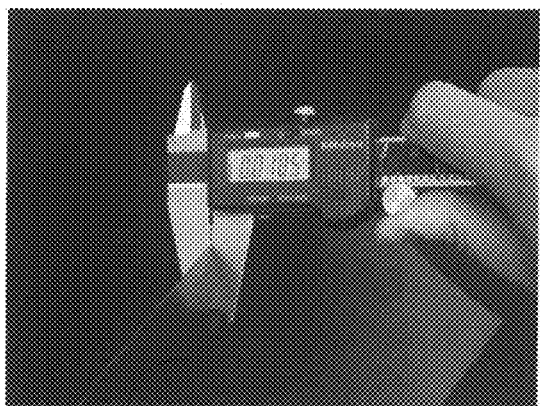
Figure 9C:
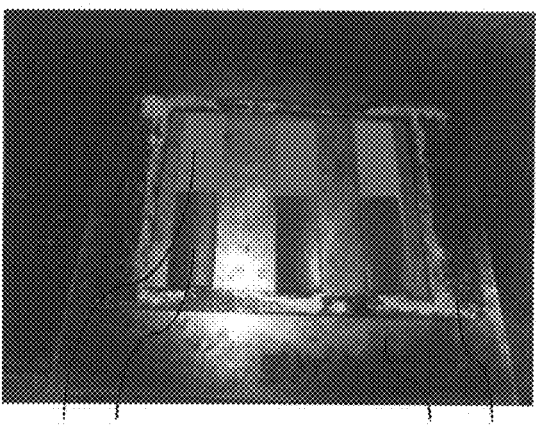

Preparation and testing test specimen may employ one or any combination of the features illustrated in FIGS. 9A through 9L. For Example, the process may include a step of weighing a polymeric material (e.g., for a core layer according to the teachings herein), 20 as illustrated in FIG. 9A. The process may include a step of measuring the thickness of the metal layer 12, 14, the core layer 20, or both, such as illustrated in FIG. 9B. A core layer 20 may be placed on a metal layer (e.g., a metal coupon) 14, such as illustrated in FIG. 9C. The core layer 20 preferably covers a portion of the metal layer 14 and a portion of the metal layer is free of core layer.

Figure 9D:
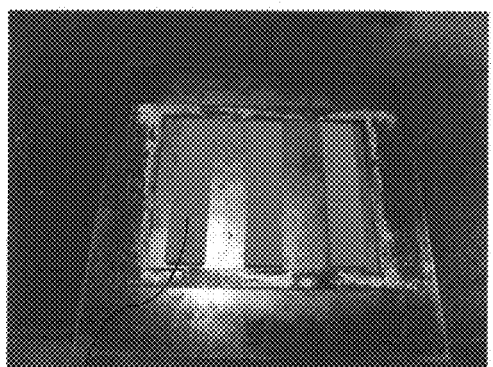
Figure 9E:
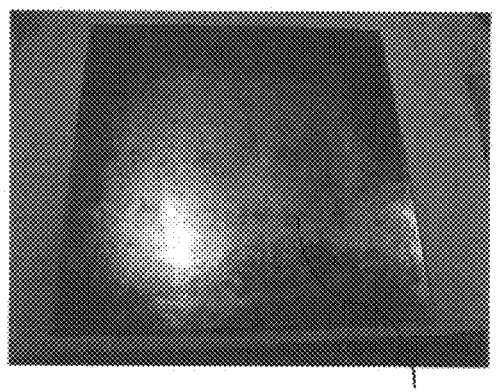
Figure 9F:
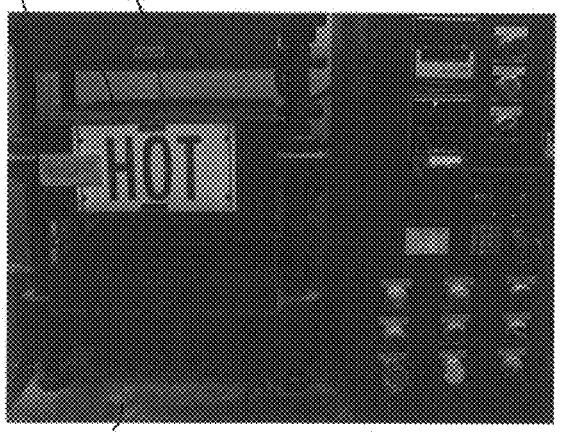
Figure 9G:
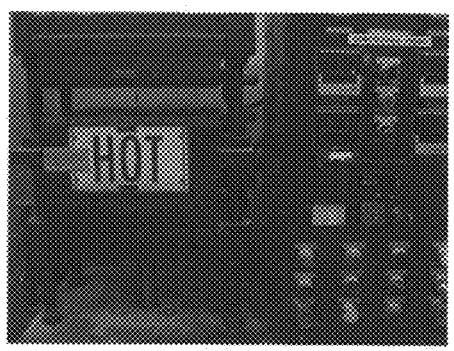
Figure 9H:
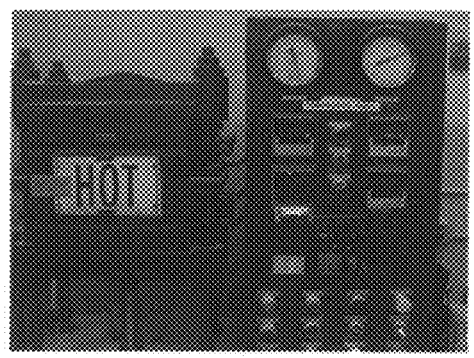
Figure 9I:
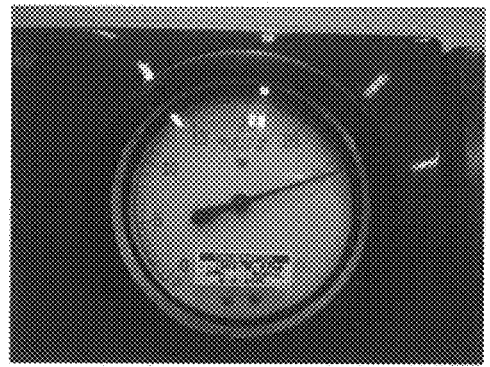
Figure 9J:
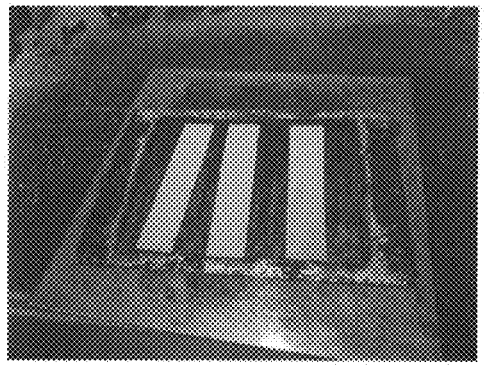
Figure 9K:
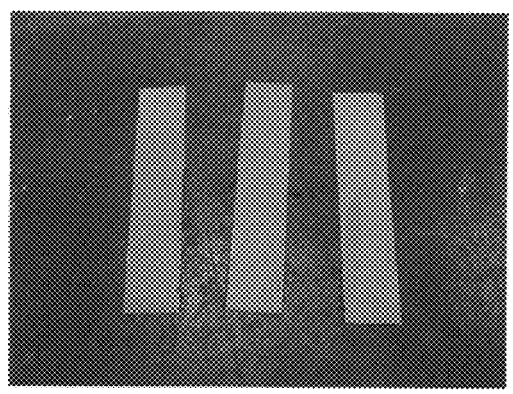
Figure 9L:
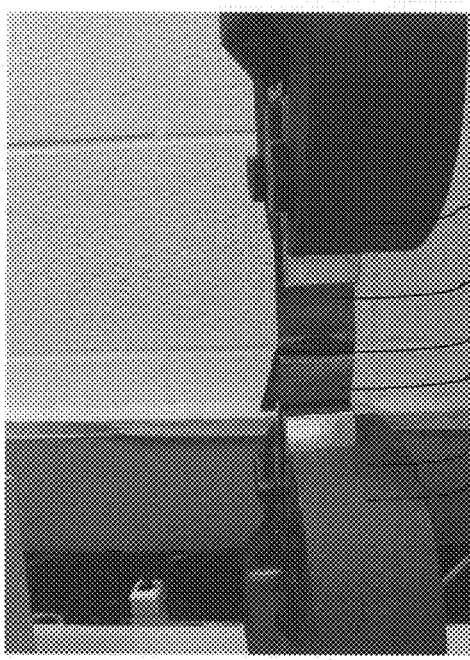

With reference to FIG. 9C, a plurality of test specimen may be prepared at the same time. A spacer 59, such as a metal picture frame having generally uniform thickness, may be used for controlling the thickness of the specimen during pressing. The materials to be pressed may be placed on a platen 52. The polymer may cover about half of each metal coupon. The polymer may be placed on the metal aligned at one edge of the metal. Preferably at least about 3 inches of uncovered metal on the opposing edge of the coupon is left available from gripping during the measurement of the peel strength. The other metal layer 12 may be placed over the core layer 20 so that the two metal layers are aligned vertically, such as illustrated in FIG. 9D. A second platen 52' may be placed over the metal layer 12, such as illustrated in FIG. 9E. The two platens 52, 52' may be arranged so that they are vertically aligned. After arranging the materials, the stack may be placed in a heated press 84 such as illustrated in FIG. 9F. Preferably the press is preheated to a predetermined temperature so that the polymer quickly heats. FIG. 9F shows a press that is preheated to about 460° F. However, higher or low preheating temperatures may be employed, according to the teachings herein. The upper plate 86 and the lower plate 86' of the press 84 are initially in an open position. The upper and lower plates 86, 86' may be maintained in an open position for a predetermined time (e.g., about 5 minutes), as illustrated in FIG. 9G. After the predetermined time, the press may be closed and a force may be applied, such as illustrated in FIG. 9H. A force of about 30 ton force may be applied as illustrated in FIG. 9I. However, it will be appreciated that higher or lower pressures may be employed depending on the characteristics of the core layer and/or the number of samples being pressed. The pressure is maintained for a predetermined time. The predetermined time may be about 1 minute, however, higher or lower times may be employed. The specimen may then be cooled either by cooling the press (not shown) or by removing the stack form the press and removing the top platen 86 (such as illustrated in FIG. 9J). The specimens may be placed on a cooling table, such as illustrated in FIG. 9K. Thus prepared, the specimen may be tested using a tensile testing apparatus, 88 such as illustrated in FIG. 9L. The edges of the metal coupons that are free of core layer may be mounted in opposing grips 90 of the tensile testing apparatus 88, as illustrated in FIG. 9L.

Figure 10A:
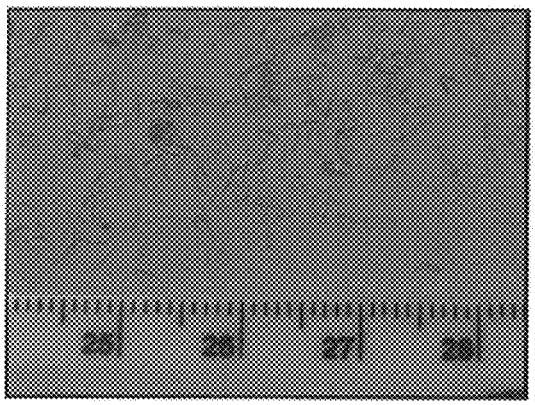
FIGS. 10A and 10B are photographs of illustrative metal fibers.
Figure 10B:
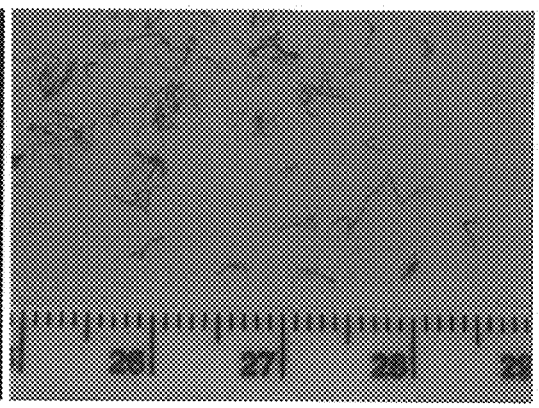
Figure 11A:
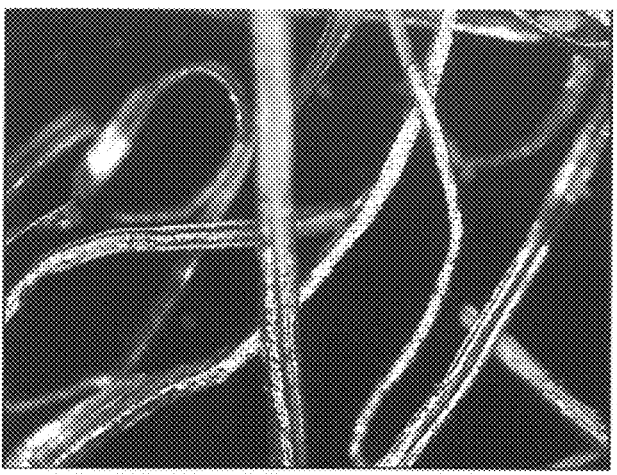
FIGS. 11A and 11B are micrographs of illustrative metal fibers.
Figure 11B:
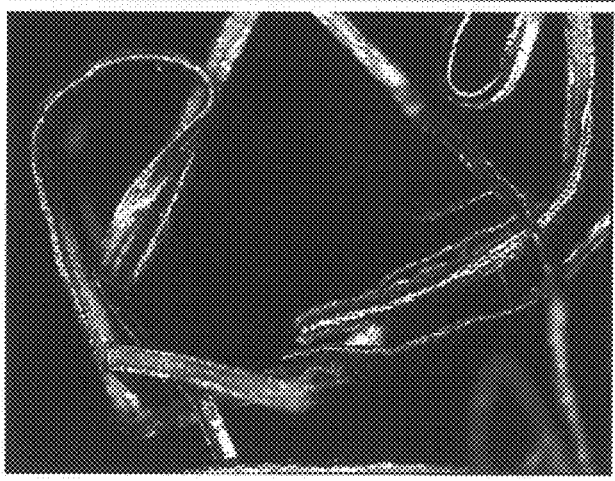

FIGS. 10A and 10B are photographs of illustrative metal fibers that may be employed according to the teachings herein. The fibers in FIG. 10A are aluminum fibers. The scale in the photograph is cm for the numerical indicators, and the minor scale is in units of mm. FIG. 10B is a similar photograph of steel fibers. FIG. 11A is a micrograph of the fibers shown in FIG. 10A, using a higher magnification. FIG. 11B is a micrograph of the fibers shown in FIG. 10B, using a higher magnification. As illustrated in FIGS. 11A and 11B, the metal fibers may have a generally rectangular cross-section (i.e., transverse to the length of the fibers).

Figure 13:
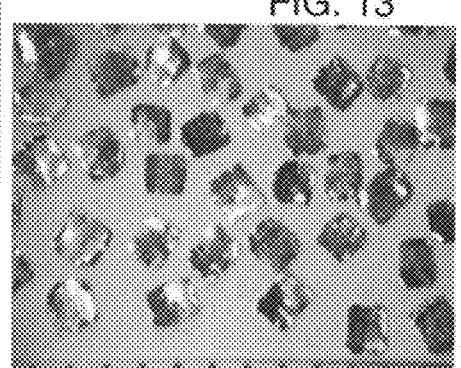
FIG. 13 is a photograph of illustrative aluminum flakes.

The core layer herein may employ metal flakes, according to the teachings herein. For example, the core layer may include aluminum flakes such as illustrated in FIG. 13. Exemplary metal aluminum flakes are described in FIG. 12. The metal flakes may have a generally square surface, such as illustrated in FIG. 13, with a much lower thickness. The scale in FIG. 13 is in units of 1 mm. Preferred aluminum flakes have a purity (i.e., aluminum concentration) of about 90 wt. % or more, about 95 wt. % or more, about 99 wt. % or more, about 99.5 wt. % or more, about 99.9 wt. % or more, about 99.93 wt. % or more, or about 99.99 wt. % or more.

EXAMPLES

Adhesion testing is performed on specimens that are prepared by placing a sheet of a polymeric core material between two strips of aluminum. Each aluminum strip has a width of 32 mm, a thickness of about 1.3 mm, and a length of about 152 mm. The specimen is placed in a heated press at a temperature sufficiently high so that the polymer can melt. A temperature of 460° F. was chosen for this study. However, it will be appreciated that higher or lower temperatures may be used depending on the characteristics (such as melting temperature, preheating time, and decomposition temperature of the polymer). Shims having the same thickness are placed in the press and a compressive force is applied while the material is heated. A preheating time of about 5 minutes without the compressive force is used. It will be appreciated that the preheating time may be shorter or longer depending on the thermal characteristics (e.g., melting properties and decomposition properties) of the polymer and the press temperature. After the preheating, a force of 30 tons is applied. The specimens are removed from the mold. Any polymer that has flowed from the core is trimmed and the polymer is cooled at ambient conditions (e.g., about 25° C.) in air. The resulting specimen has a thickness that is nearly equal to the thickness of the shim. The shim may act as a stop to control the thickness.

The specimen is tested using a T-peel test, as illustrated in FIG. 4A. The two metal layers are pulled apart at a constant rate of about 0.5 inches/min (i.e., about 12.7 mm/min). The force is measured. The variation in the force is typically about 20% or less, and the adhesion is characterized by the average force.

In Example 1 and Example 3, the core polymeric material includes about 20 volume percent aluminum fibers (aluminum alloy 5056) and about 80 volume percent of one or more polyethylene copolymers. The polyethylene copolymer includes at least 65 wt. % ethylene. In Example 2, the core polymeric material does not include any metallic fibers and only includes the polyethylene copolymer. The same polyethylene copolymer is used in Examples 1, 2, and 3. The same type of aluminum fibers, having the same distribution of fiber lengths and formed of the same grade of aluminum are used in Examples 1 and 3.

Examples 1 and 2 are prepared by pretreating the aluminum surfaces of the foil that later contact the polymeric core material. The pretreating is performed prior to placing the polymeric core material between the two aluminum sheets. The pretreating step includes (1) washing the surfaces of the aluminum with an alkaline solution; (2) contacting a surface of the aluminum with a metal phosphate for cleaning the surface, coating the surface, or both; and (3) rinsing the surface of the aluminum. The rinsing of the surface is performed using a solution including CHEMSEAL® 59 sealer commercially available from PPG Industrial Coatings. Although other solutions may be employed in the rinsing step, the rinsing step preferably employs a solution that is chrome-free, a solution that includes a fluoride, or both (i.e., a solution including fluoride that is chrome-free).

Example 3 is prepared with a pretreating step consisting essentially of wiping the surface with isopropyl alcohol. The pretreating of the aluminum in Example 3 does not employ any of the pretreating steps described above for Examples 1 and 2.

In Examples 1, 2, and 3, the pretreatment of the aluminum surface does not include a step of contacting a surface of the aluminum with a polymer or a polymerizable material.

The preparation and peel test results for Examples 1-3 are summarized in Table 1.

TABLE 1

| | Example 1 | Example 2 | Example 3 |
|---|---|---|---|
| Top Skin Layer | | | |
| Aluminum 1.25 thick mm | Yes | Yes | Yes |
| Alcohol clean with isopropyl alcohol | Yes | Yes | Yes |
| Zinc phosphate clean and/or coating with CHEMFOS ® 700 | Yes | Yes | |
| Rinsing with CHEMSEAL ® 59 | Yes | Yes | |
| Bottom Skin Layer | | | |
| Aluminum 1.25 thick mm | Yes | Yes | Yes |
| Alcohol clean with isopropyl alcohol | Yes | Yes | Yes |
| Zinc phosphate clean and/or coating with CHEMFOS ® 700 | Yes | Yes | |
| Rinsing with CHEMSEAL ® 59 | Yes | Yes | |
| Core Layer | | | |
| Aluminum Fibers, volume % | 20 | 0 | 20 |
| Linear low density polyethylene and ethylene-hexene plastomer, volume % | 80 | 100 | 80 |
| Thickness (mm) of composite | | | |
| Number of specimens | 9 | 6 | 6 |
| Minimum thickness, mm | 2.95 | 2.92 | 2.93 |
| Maximum thickness, mm | 3.03 | 2.98 | 3.03 |
| Average thickness, mm | 2.99 | 2.94 | 2.98 |
| Adhesion results (ISO 11339) | | | |
| Number of specimens | 9 | 6 | 6 |
| Minimum Peel Force (lb force) | 77.9 | 33.0 | 27.2 |
| Maximum Peel Force (lb force) | 128.5 | 51.1 | 47.3 |
| Average Peel Force (lb force) | 117 | 41 | 8 |
| Resistance | | | |
| Average Resistance (mΩ) | 31 | $>>10^6$ | 72 |

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The to "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist or even consist essentially of the elements, ingredients, components or steps.

Plural elements, ingredients, components or steps can be provided by a single integrated element, ingredient, component or step. Alternatively, a single integrated elements, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

10 Composite material including fibers
12 First metal layer
14 Second metal layer
16 Surface of the first metal layer facing the core layer
18 Surface of the second metal layer facing the core layer
20 Core layer
22 Polymer phase
24 Particulate filler phase
26 Isopropyl alcohol
30 Plate shaped particulate filler (e.g., flake)
32 Fiber shaped particulate filler
34 Cross-section of fiber orthogonal to the length.
40 Sheet of composite material
42 Plastically deformed sheet (e.g., stamped sheet)
44 Plastically deformed region
50 Preparation of peel test samples
51 Peel test sample precursor 52 Platen for heating the core layer during preparation of a peel test sample
54 Region of peel test sample with a core layer disposed between two metal layers
56 Region of peel test sample with no core layer between metal layers
58 Spacer for maintaining a predetermined separation between the first metal layer and the second metal layer
59 Spacer for maintaining a predetermined separation between two platens and/or for maintaining a generally uniform predetermined thickness of a peel test sample.
60 Preparation of peel test samples between two platens.
62 Compressive force applied to platens
64 Temperature of core material in a peel test samples.
66 Initial thickness of core material
68 Final thickness of core material
70 Heated peel test samples luring process of preparing the samples
72 Edge surface of metal layer of peel test sample
80 Peel test sample
84 Heated press
86 Plates of the heated press
88 tensile testing apparatus
90 grips
100 Composite material without fibers
120 Core layer without metal fibers

What is claimed is:

1. A process for preparing a composite material comprising the steps of:
   i) contacting a surface of a first aluminum foil with a metal phosphate for cleaning the surface, for coating the surface, or both;
   ii) contacting the surface of the first aluminum foil with a filled polymeric core material; and
   iii) adhering the filled polymeric core material to the surface of the first aluminum foil using heat, pressure, or both;
   wherein the filled polymeric core material includes about 2 volume percent to about 50 volume percent metal fibers; and about 50 volume percent to about 98 volume percent of one or more polyolefin resins, wherein the polyolefin resin includes about 65 weight percent or more of an α-olefin;
   wherein the aluminum is free of a polymeric coating prior to the step of adhering the aluminum to the polymeric core layer;
   the polyolefin resin includes a polyethylene copolymer;
   the composite material is a sandwich composite including the filled polymeric core material interposed between the first aluminum foil and a second aluminum foil.

2. The process of claim 1, wherein the process includes a step of contacting a surface of the first aluminum foil with a solution including a fluoride, for sealing the surface, rinsing the surface, or both.

3. The process of claim 1, wherein the polyethylene copolymer includes 98 weight percent or more of one or more α-olefins, based on the total weight of the polyethylene copolymer.

4. The process of claim 3, wherein the metal fibers in the polymeric core material are ribbon fibers and have an aspect ratio of about 10 or more.

5. The process of claim 4, wherein the process includes (1) sufficiently pretreating the surface of the first aluminum foil and (2) including a sufficient concentration of fibers so that:
   the peel strength between the first aluminum foil and the filled polymeric core material is greater than the peel strength of an identically prepared sample except the filled polymeric core material is replaced by the same polymer without the fibers; and
   the peel strength between the first aluminum foil and the filled polymeric core material is greater than the peel strength of an identically prepared sample except the surface of the aluminum foil is not contacted with the treatment fluid.

6. The process of claim 1, wherein the adhesion of the filled polymeric core material to the surface of the first aluminum foil is characterized by a peel strength that is increased by about 15% or more compared with the peel strength of the polymeric core material to an aluminum surface treated only by wiping the surface with isopropyl alcohol.

7. The process of claim 1, wherein the fibers are aluminum fibers.

8. The process of claim 7, wherein the polymeric core material is heated to a temperature of about $T_m-30°$ C. or more prior to contacting the polymeric core material with the surface of the first aluminum foil, where $T_m$ is the melting temperature of the polymer in the polymeric core material.

9. The process of claim 8, wherein at least a portion of the polymer in the polymeric core material is in a molten state when it is contacted with the surface of the first aluminum foil.

10. The process of claim 7, wherein the polymeric core material is heated after contacting the core material to the surface of the first aluminum foil.

11. The process of claim 1, wherein the polymeric core material is contacted to a surface of second aluminum foil so that a sandwich including the polymeric core material interposed between two aluminum foils is formed, wherein the process includes a step of pretreating the surface of second aluminum foil for improving the adhesion.

12. The process of claim 1, wherein the polymeric core material includes from about 5 volume percent to about 30 volume percent aluminum fibers, based on the total volume of the polymeric core material.

13. The process of claim 1, wherein the polyethylene copolymer has a crystallinity of about 25 percent to about 70 percent, as measured by differential scanning calorimetry, and the polyethylene copolymer has a melting temperature of about 100° C. or less, as measured using differential scanning calorimetry.

14. The process of claim 1, wherein the one or more polyolefin resins includes a polyethylene plastomer.

15. The process of claim 1, wherein the process comprises a step of contacting the surface of the first aluminum foil with an alkaline aqueous solution including a metal hydroxide.

16. The process of claim 15, wherein the alkaline aqueous solution has pH from about 10 to about 13.

17. The process of claim 15, wherein
   the polyethylene copolymer includes 98 weight percent or more of one or more α-olefins, based on the total weight of the polyethylene copolymer,
   the metal fibers in the polymeric core material have an aspect ratio of about 10 or more;
   the aluminum is free of a polymeric coating prior to the step of adhering the aluminum to the polymeric core layer;
   wherein the polymeric core material is contacted to a surface of a second foil of aluminum so that a sandwich composite including the polymeric core material interposed between two aluminum foils is formed, wherein the process includes a step of pretreating the surface of aluminum for improving the adhesion;
   the polymeric core material includes from about 5 volume percent to about 30 volume percent aluminum fibers, based on the total volume of the polymeric core material;

the fibers are aluminum fibers;
the process includes adhering the filled polymeric core material to the surface of the aluminum foil using both heat and pressure, and
the process includes a step of cooling the sandwich composite to a temperature below the melting temperature of the polymer.

18. The process of claim 17, wherein at least a portion of the polymer is in a molten state when it is contacted with the surface of the aluminum.

19. The process of claim 18, wherein the alkaline aqueous solution has pH from about 10 to about 13; and the polyethylene compolymer has a crystallinity of about 25 percent to about 70 percent, as measured by differential scanning calorimetry.

20. A process for preparing a sandwich composite material comprising the steps of:
  i) contacting a first surface of a first aluminum foil with a metal phosphate for cleaning the surface, for coating the surface, or both;
  ii) contacting a first surface of a second aluminum foil with a metal phosphate for cleaning the surface, for coating the surface, or both;
  iii) contacting the first surface of the first aluminum foil with a filled polymeric core material;
  iv) contacting the first surface of the second aluminum foil with the filled polymeric core material; and
  v) adhering the filled polymeric core material to the first surfaces of the first and second aluminum foils using heat and pressure;
wherein the filled polymeric core material includes about 2 volume percent to about 50 volume percent metal fibers; and about 50 volume percent to about 98 volume percent of one or more polyolefin resins, wherein the polyethylene copolymer includes 98 weight percent or more of one or more α-olefins; and
wherein the aluminum is free of a polymeric coating prior to the step of adhering the first surface of the first and second aluminum foils to the polymeric core layer.

21. A process for preparing a composite material comprising the steps of:
  i) contacting a surface of a first metal foil with a metal phosphate for cleaning the surface, for coating the surface, or both;
  ii) contacting a surface of a second metal foil with a metal phosphate for cleaning the surface, for coating the surface, or both;
  iii) contacting the surface of the first metal foil with a filled polymeric core material; and
  iv) adhering the filled polymeric core material to the surface of the first metal foil using heat and pressure;
  v) contacting the surface of the second metal foil with the filled polymeric core material; and
  vi) adhering the filled polymeric core material to the surface of the second metal foil using heat and pressure;
wherein
the filled polymeric core material is sandwiched between the first and second metal foils;
the filled polymeric core material includes about 2 volume percent to about 50 volume percent metal fibers and about 50 volume percent to about 98 volume percent of one or more polyolefin resins,
the process includes a step of pretreating the surface of the first metal foil for improving the adhesion;
the polyolefin resin includes a polyethylene copolymer including 98 weight percent or more of one or more α-olefins, based on the total weight of the polyethylene copolymer;
the metal fibers in the polymeric core material have an aspect ratio of about 10 or more; and
the first metal foil is free of a polymeric coating prior to the step of adhering the first metal foil to the polymeric core layer.

* * * * *

UNITED STATES PATENT AND TRADEMARK OFFICE
CERTIFICATE OF CORRECTION

PATENT NO.        : 9,233,526 B2                                        Page 1 of 1
APPLICATION NO.   : 13/795856
DATED             : January 12, 2016
INVENTOR(S)       : Chadwick Lee VanSweden and Shimon Mizrahi It is certified that error appears in the above-identified patent and that said Letters Patent is hereby corrected as shown below:

Title Page

Page 3, (56) References Cited, Foreign Patent Document, reads: "EP 6429020" and should read:
--EP 642920--

Page 4, (56) References Cited, Foreign Patent Document, reads: "JP 2011192792" and should read:
--JP 2001192792--

Signed and Sealed this
Nineteenth Day of April, 2016

Michelle K. Lee
*Director of the United States Patent and Trademark Office*